Feb. 25, 1941.  R. L. WILSON  2,232,752
CONTROL APPARATUS
Filed Feb. 12, 1940  7 Sheets-Sheet 1
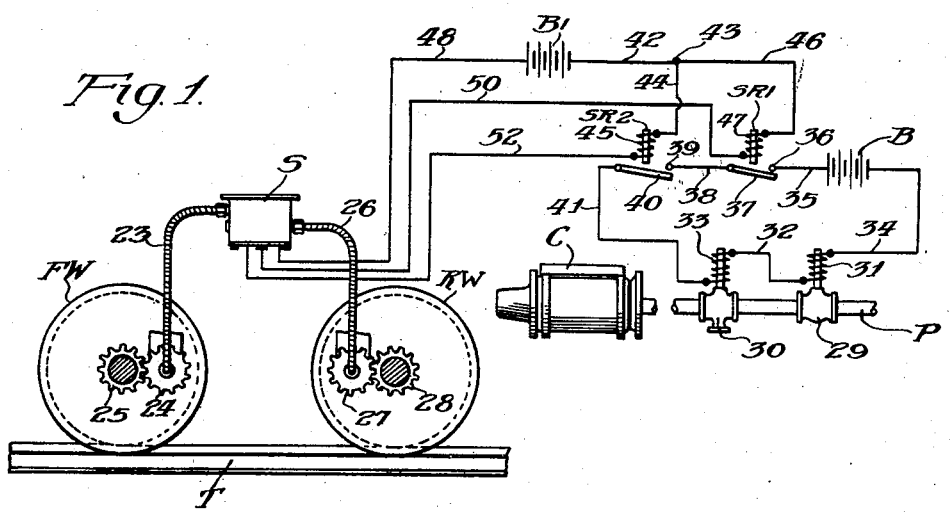
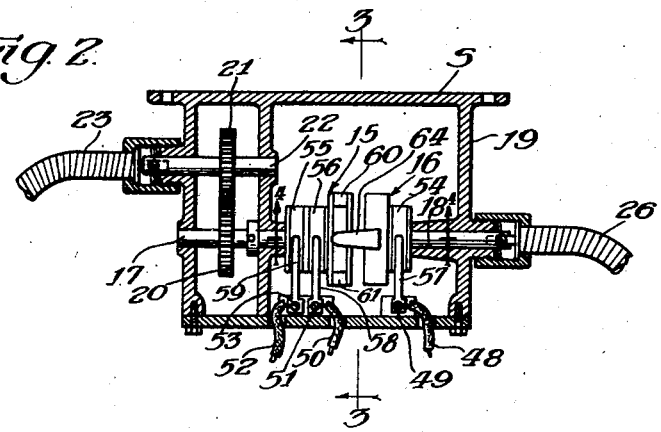
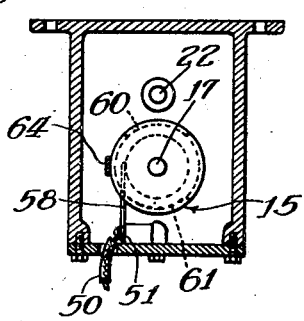
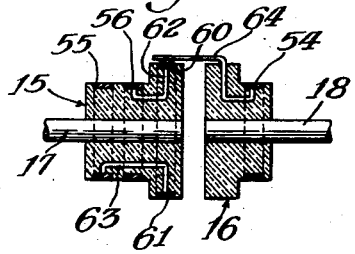
Inventor:
Rosser L. Wilson
By: Bell, Wallace and Cannon
Attorneys

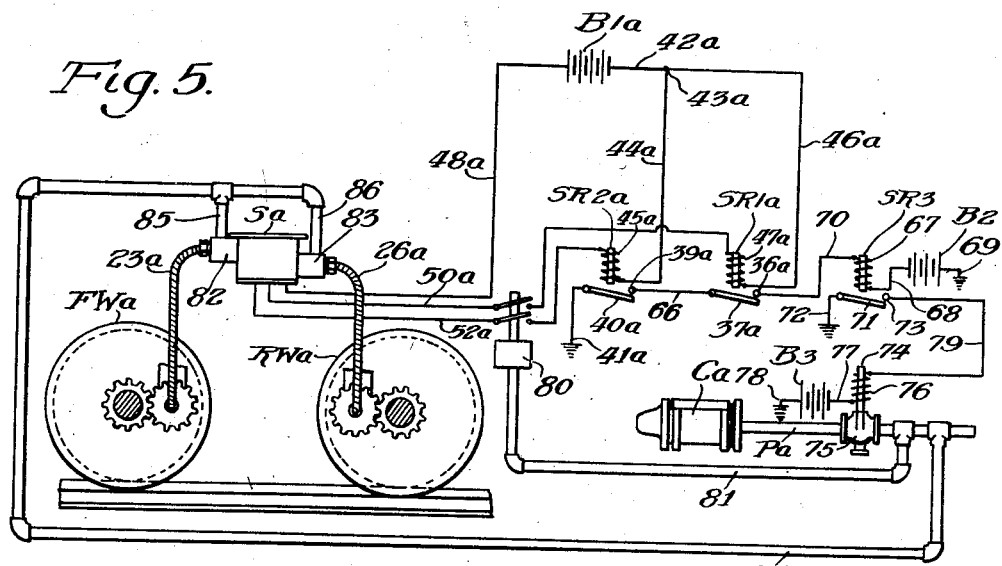

Feb. 25, 1941.   R. L. WILSON   2,232,752
CONTROL APPARATUS
Filed Feb. 12, 1940   7 Sheets-Sheet 3
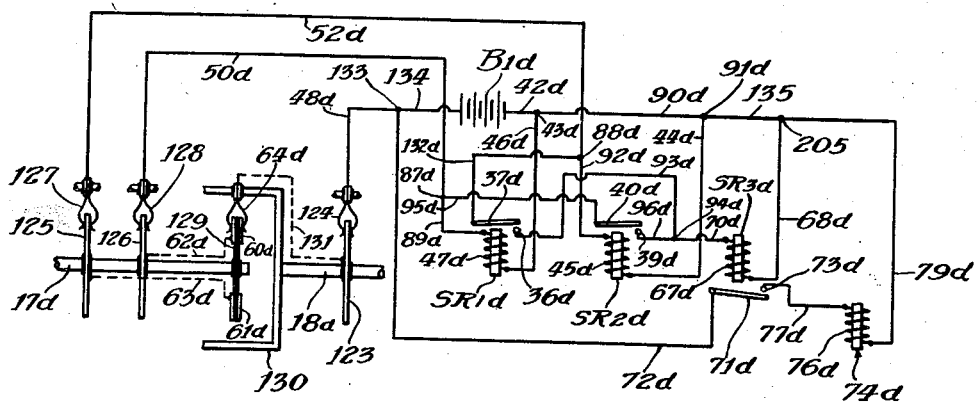
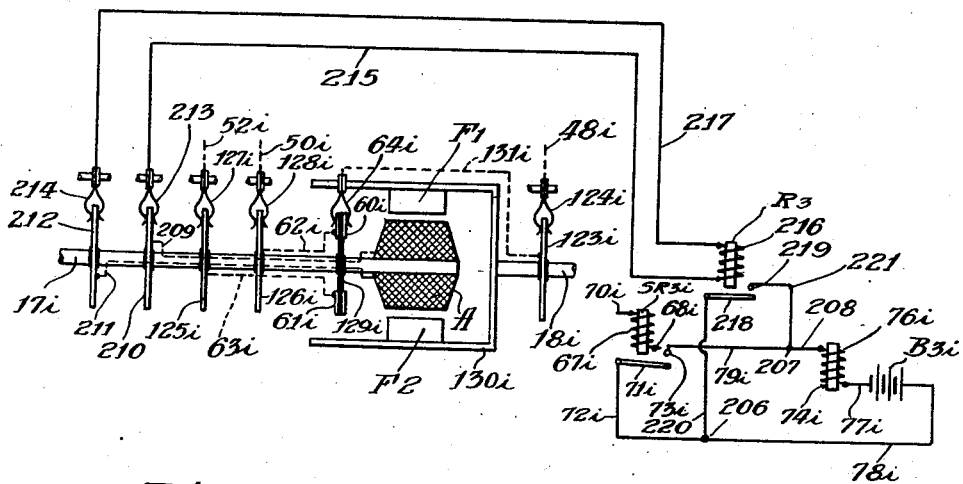
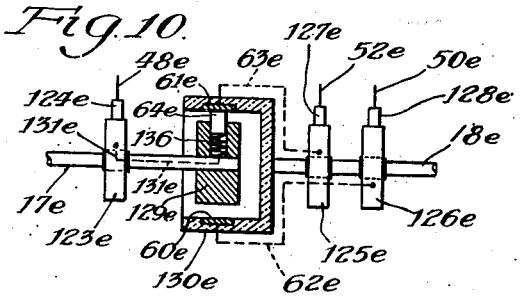
Inventor:
Roser L. Wilson
By: Belt, Wallace and Cannon
Attorneys

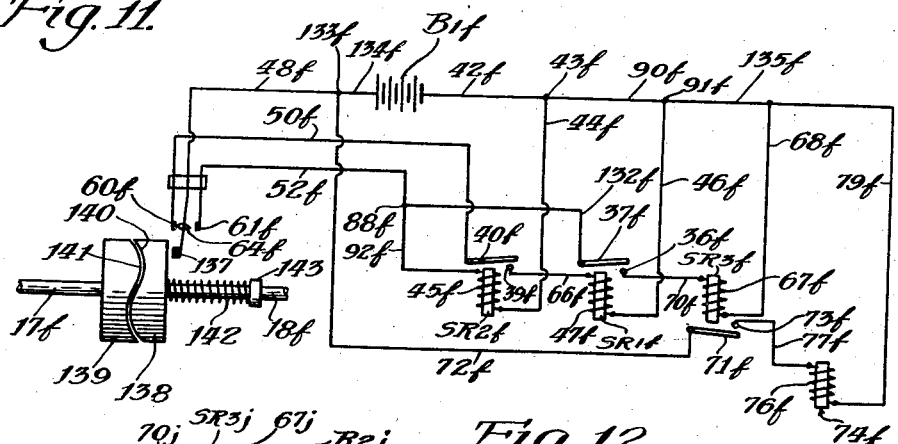
Fig. 11.
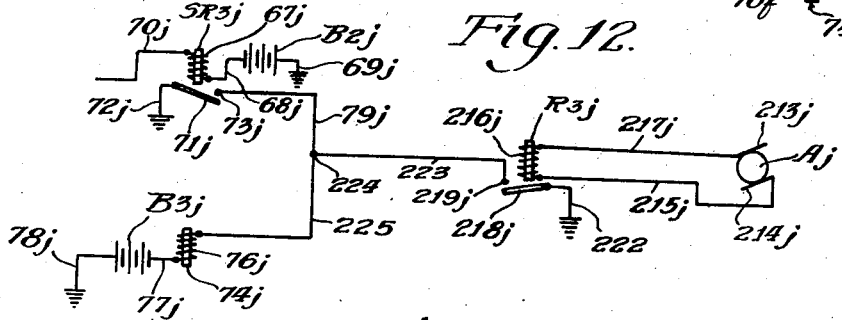
Fig. 12.
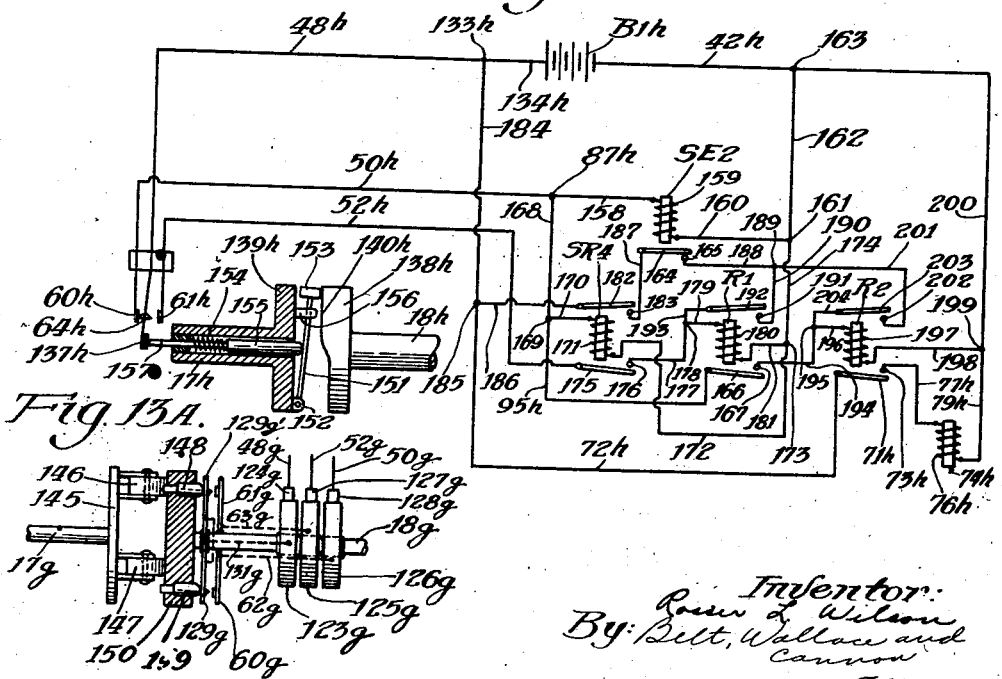
Fig. 13.
Fig. 13A.

Feb. 25, 1941.  R. L. WILSON  2,232,752
CONTROL APPARATUS
Filed Feb. 12, 1940   7 Sheets-Sheet 5

Inventor
Roscoe L. Wilson
By Belt, Wallace and Cannon
Attorneys

Feb. 25, 1941.  R. L. WILSON  2,232,752
CONTROL APPARATUS
Filed Feb. 12, 1940  7 Sheets-Sheet 6
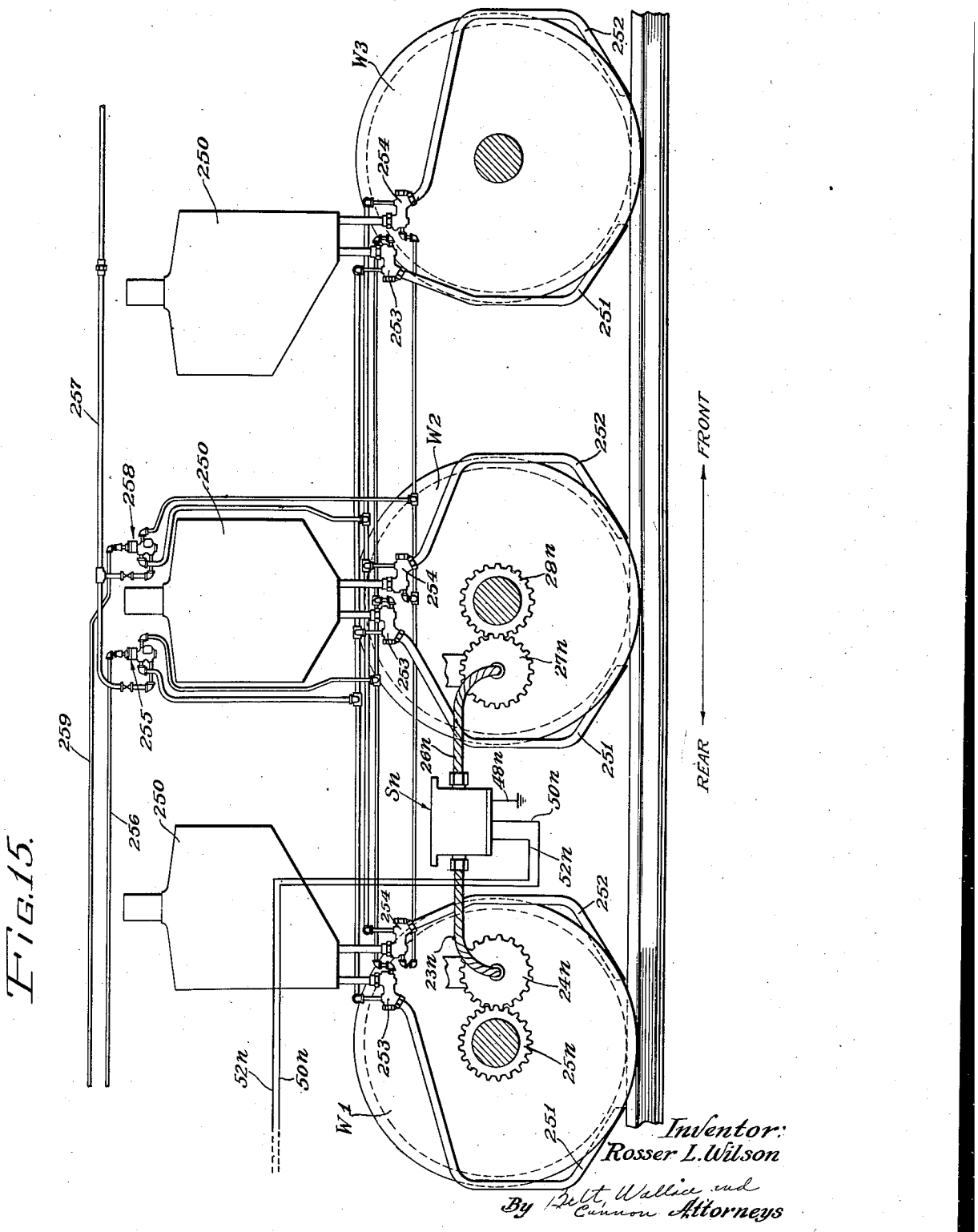
Inventor:
Rosser L. Wilson
By Bell, Wallace and Cannon Attorneys

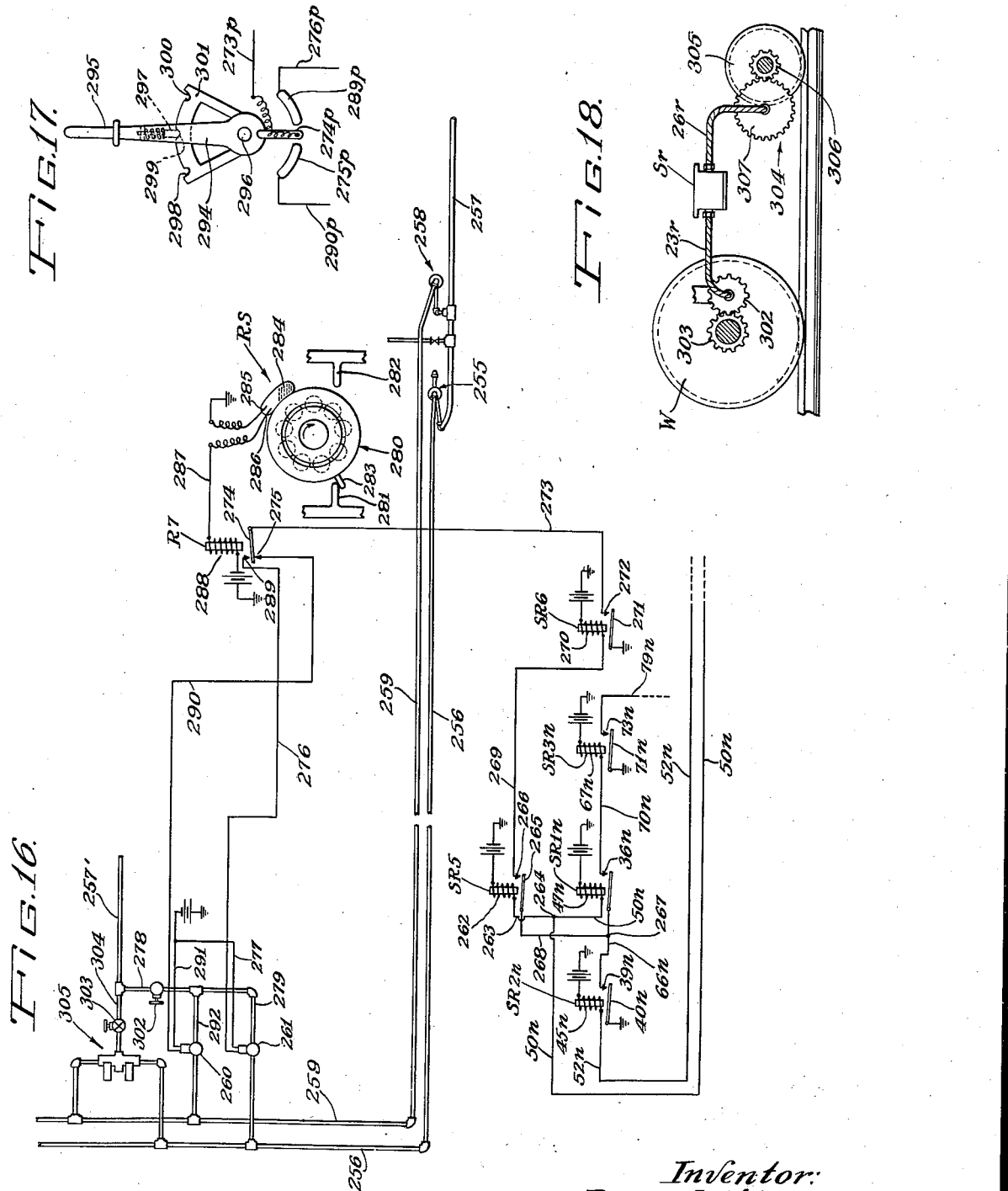

Patented Feb. 25, 1941

2,232,752

UNITED STATES PATENT OFFICE 2,232,752

CONTROL APPARATUS

Rosser L. Wilson, Mahwah, N. J., assignor to The American Brake Shoe and Foundry Company, Wilmington, Del., a corporation of Delaware Application February 12, 1940, Serial No. 318,562

48 Claims. (Cl. 291—15)

This application is filed in place of and constitutes a continuation in part of my allowed application Serial No. 213,103, filed June 10, 1938.

This invention relates to control apparatus and particularly to apparatus for controlling or otherwise affecting the braking of railway equipment and the like.

In the normal operation of railway equipment it is believed that there is no slippage at the points of contact of the wheels of the equipment with the rails and that the wheels roll along the rails. During a braking operation on such equipment the retarding forces effective on the wheels react at the rails to slow down the rolling movement of the wheels and so long as the adhesion between each wheel and rail on which it rolls exceeds the retarding force effective on the wheel, the wheel is retarded without slippage at the contact thereof with the rail. It has been observed however, where the retarding force in a braking operation exceeds the force of adhesion between a wheel and the rail on which it rolls, that the wheel slips on the rail and is thereafter retarded at a rate exceeding that at which it would have been retarded had not the slippage occurred and as a result the wheel comes to rest prematurely and thereafter slides along the rail.

There are many factors which may cause the retarding force effective on a wheel in a braking operation to exceed the adhesion between the wheel and the rail on which it rolls. For example, the braking means of railway equipment is so arranged that the friction between the elements thereof is less than what has come to be generally accepted as the usual value of the adhesion or friction between the wheel or wheels decelerated by operation of the braking means and the rail on which such wheel or wheels rolls or roll. There may be, however, an unpredictable increase in the friction between the elements of the braking means or the friction between the wheel or wheels and rail or rails may unaccountably drop below what has come to be generally accepted as the value of such friction, and of course there may be a combination of such variations. If such variation occurs in a braking operation it is quite likely that the wheel or wheels affected thereby will slip on, rather than roll on, the rail or rails whereupon, as previously explained, the wheel or wheels may prematurely stop rolling and thereafter slide along the rail or rails. Such sliding of the wheels along the rails may impair the braking operation in which it occurs and may result in serious damage such as producing so-called flats on the wheels.

It will be understood that wheel sliding may be occasioned in a wide variety of ways but that however occasioned it is objectionable.

Thus an important object of the present invention is to prevent in a novel manner, in the course of a braking operation, sliding of a wheel of railway equipment along the rail on which the wheel rolls.

Further and related objects are to detect slippage, in a braking operation, of a wheel on the rail on which it normally rolls before the wheel prematurely stops rolling and begins to slide along the rail and to render the braking means operative to effect deceleration of the wheel ineffective, or to reduce the retarding force established by operation of such means, until normal rolling of the wheel affected by the retarding force has been reestablished; to again render the braking means effective after normal rolling of the wheels has been reestablished if the means operative to bring about operation of the braking means, which were effecting retardation of the wheels when slippage thereof on the rails occurred, are still being maintained operative at the time the normal rolling of the wheels is reestablished.

It has been observed in braking operations on railway equipment that, when a wheel slips on the rail on which it normally rolls and prematurely stops rolling and thereupon slides along the rail, the wheel, insofar as its rotative movement is concerned, decelerates rapidly after the slippage occurs and quickly stops rolling to thereupon start to slide and also that where several wheels on different axles substantially simultaneously or simultaneously slip on the rail or rails on which they normally roll the wheels usually decelerate, insofar as rotative movement thereof is concerned, at different rates and consequently stop rolling and start to slide at different times. Such lack of uniformity in the slowing down of the wheels is probably due to variations in the conditions at the various wheels. These variations in the conditions may be due to differences in the loads on the various wheels on different axles, differences in the retarding forces affecting the respective wheels on different axles, or the like. In any event, however, where several wheels on different axles slip on the rail or rails, a variation in the rates of rotation of the various wheels usually arises before any wheel prematurely stops rolling and starts to slide along a rail. The present invention is predicated upon this observation, which is to say, it is another important object of the present invention to effect a control operation in order that a condition of wheel sliding will be prevented in event a wheel slips on the rail on which it normally rolls and thereafter slows down more rapidly insofar as its rotative movement is concerned, than another associated wheel in the course of a braking operation.

Still another object of this invention is to operate elements at speeds respectively proportionate to the rates of rotation of at least two wheels on a railway car or the like that are decelerated by different or independent braking means and to effect a control operation upon a predetermined variation in the rates of rotation of said elements relative to each other as, for example, where there is such a variation in rates of rotation in the course of a braking operation, to release the braking means effective on the wheel or wheels with which the element or elements rotating at the lower rates are associated, or to reduce the retarding force established by operation of such means, whereby sliding of the wheel or wheels, decelerated by such braking means, along the rail or rails on which it or they normally roll may be prevented.

It is recognized that the rates of movement of the various movable elements, such as the rates of rotation of the various wheels on a railway car or the like that are decelerated by independent braking means may not always be the same. For example, as applied to railway equipment, there may be a difference in the diameters of such wheels at the lines of contact thereof with the rail or rails which will, of course, cause the wheels to rotate at different rates in normal operation as well as during a braking operation. Thus elements operated at rates proportionate to the rates of rotation of wheels that are decelerated by independent braking means may not always operate at the same rate either in normal operation or during a braking operation. Where such elements are employed to effect a control operation, such as the release of the braking means when the elements operate at different rates during a braking operation, there may be instances where the elements will be operating at different rates even during a braking operation and yet there will be no need of effecting the control operation because there will not be present an abnormal condition which the control operation is to overcome.

Hence still another object of the present invention is to employ elements, each operative at a rate proportionate to the rate of rotation of a wheel on railway equipment, to effect a control operation, such as the release of the braking means, only when the elements operate at differences in rates predetermined to be indicative of abnormal conditions.

Since in many instances, as in the case of railway equipment, elements operated at rates proportionate to the rates of rotation of wheels as aforesaid may operate at different rates, as in the course of a braking operation, under conditions in which it will not be desirable to effect a control operation, such as the selective releasing of the independent braking means operative to decelerate the respective wheels or sets thereof, it is advantageous to interpose devices entailing a time factor in their operation intermediate the elements and the means under control thereof so that a time factor will enter into the determination of the existence of an abnormal condition and so to do constitutes still another object of the present invention.

More specifically, an object of this invention is to bring about successive or alternate periods of operation of slow-to-release relays and when the intervals between such periods of operation are reduced in a predetermined amount to effect simultaneous operation instead of alternate operation, and an object ancillary to the foregoing is to render operative means under control of the relays only upon simultaneous operation of such slow-to-release relays.

Further objects are to employ elements, such as may be operated at rates proportionate to the rates of rotation of the wheels of railway or like equipment that are decelerated by independent braking means, to alternately render operative devices which may be brought into simultaneous operation and thereby bring about a control operation or the like and to maintain operative for a predetermined time whatever means are rendered effective to bring about the control operation whenever the interval intermediate alternate periods of operation of alternately operable devices is so reduced that the intermediate interval is eliminated; and to effect concurrent operation of normally alternately operable devices to bring about a control operation or the like and to maintain operative for a predetermined time whatever means are effective to bring about the control operation only under predetermined conditions.

In an arrangement where devices are alternately set in operation in such a way that under predetermined conditions the interval between the alternate operations is so reduced that the operations become simultaneous rather than alternate, it will be recognized that there will be instances where such simultaneous operation may be relatively brief. If such an arrangement is utilized to effect a control operation, such as the release of the braking means employed to decelerate a particular wheel or set of wheels of railway equipment, conditions might arise where the aforesaid relatively brief simultaneous operations in rather rapid succession might be caused to repeatedly occur for relatively short periods, and this would cause the control or other operation brought about by such simultaneous operations to be initiated and interrupted, successively, as where the control operation is the release of the braking means of railway equipment operative to slow down a particular wheel or set thereof, it might bring about alternate release and application of such braking means in rather rapid succession. Furthermore, conditions might arise where the aforesaid simultaneous operation might be brief but should nevertheless effect a relatively prolonged control operation such as relatively prolonged release of the braking means.

Hence, still another object of the present invention is to associate with alternately operable devices, which may be brought into simultaneous operation, an arrangement whereby the simultaneous operation of the devices will be caused to effect a predetermined operation even though the simultaneous operation may be relatively brief, and an object ancillary to the foregoing is to employ timed apparatus in association with alternately operable devices that may be brought into simultaneous operations so that upon simultaneous operation of the devices a predetermined operation may be effected for at least a predetermined time even though a period of simultaneous operation of the normally alternately operative devices may be relatively brief.

If slippage of a wheel or set thereof, such as wheels mounted at opposite ends of an axle, on the rail or rails on which it or they normally rolls or roll occurs during a braking operation and such slippage is such as might result in wheel sliding, and thereupon the braking means are rendered ineffective or the retarding force established by operation of such means is reduced, the wheel, or a set thereof, will resume normal rolling rather than slip on, or slide along, the rail or rails, and when such rolling is resumed the braking means may be again rendered effective. Hence among the objects of this invention are to not only render the braking means operative to decelerate a particular wheel, or a particular set of wheels, ineffective, or to reduce the retarding force established by operation thereof, when a wheel or set thereof slips on the rail or rails in the course of a braking operation in such a way that wheel sliding might result, but to render the braking means effective, if the means operative to bring about the braking operation are still operating, as soon as the wheel or wheels resumes normal rolling along the rail or rails, and to render the braking means effective, if the means operative to bring about the braking operation are still operating, after a predetermined period of time during which such braking means have been rendered ineffective, or the retarding force established by operation of the braking means is reduced, by reason of a wheel or set thereof slipping on the rail or rails in the course of a braking operation, provided the wheel or wheels is or are again normally rolling on the rail or rails upon the elapse of such period of time.

The safety factor must be considered in any apparatus pertaining to the braking means of railway equipment and obviously any means which effects release of the braking means, or which reduces the retarding forces established by operation thereof, must be of such a nature that the braking means will not be permanently or improperly rendered ineffective or reduced in effectiveness, and hence yet another object of this invention is to so arrange the apparatus for effecting release of the braking means, or for reducing the retarding forces established by operation thereof, that the braking means will be released, or reduced in effectiveness, only under predetermined abnormal conditions, and an ancillary object is to so control the apparatus that the braking means will be released, or reduced in effectiveness, for only a predetermined period of time.

A still further object somewhat related to the immediately foregoing objects is to so arrange the apparatus for effecting release of the braking means of railway equipment, or for reducing the retarding force established by operation of such means, that the apparatus will be rendered inoperative until manually again rendered operative in event the apparatus should fail to operate in the manner intended.

Still other objects of the invention are to indicate the operation of apparatus operative to render the braking means of railway equipment ineffective or which are operative to reduce the effectiveness of such means; to so arrange such apparatus that it may be rendered ineffective if so desired as, for example, to enable railway equipment to be brought to a stop promptly under conditions which make this imperative even though in such an instance a wheel or wheels may be slid along the rails; to employ alternately energizable electrically-operated devices which may be rendered simultaneously operative under predetermined conditions to control the flow of current through a circuit other than the energizing circuit of such devices; to enable my novel control means to be maintained ineffective until initiation and prevalence of an operation to be controlled; to employ a plurality of detecting arrangements and thereby insure accurate and positive operation of my novel control means; to enable adjustment of my novel control means and thereby provide for variation in the sensitiveness thereof; to employ a series circuit and to effect a predetermined operation only upon closure of such circuit; to employ a novel switch for regulating operation of slow-to-release relays or other devices embodying a time factor in their operation; to effect simultaneous operation of slow-to-release relays or the like only upon predetermined relative movement between elements of means for generating an electric motive force; to move elements of means for generating an electromotive force relative to each only upon predetermined conditions; to provide a novel switch for controlling flow of electric current through a circuit in which said switch is included; and to provide a novel control apparatus of simple and economical construction and positive and efficient operation and which will withstand severe service without requiring constant attention and adjustment.

An additional object is to affect the braking of railway equipment or the like in a manner other than by releasing the brakes or reducing the braking pressure, as for example, by supplying sand or the like to the rails in proximity to the wheels when a predetermined tendency toward a wheel sliding condition is exhibited. In the present instance, the sanding apparatus is responsive to the means which detects a predetermined difference in the relative rotative speeds of different wheels or the like and it may be used in conjunction with means that control the braking apparatus. If resort is had to such a conjoint arrangement, the apparatus is preferably so arranged that the control of the sanding apparatus is more sensitive to predetermined variations in the relative rotative speeds of different wheels or the like than is the control for the operation of the braking means. Hence when a predetermined variation in relative rotative speeds of the wheels is experienced, the rails are sanded ahead of the wheels to thereby increase the coefficient of adhesion between the wheels and the rails, and if this operation is successful in establishing normal rolling of the wheels, the brake pressure control means is not called into operation. Stated more broadly, it is an object of the invention to render the control apparatus responsive to variations in rotative speeds of the wheels or the like for effecting different control operations for different selected degrees of such variation during a braking operation.

Another object is to automatically sand the rails ahead of the driving wheels of a locomotive or the like whenever a predetermined tendency toward skidding of any of these wheels arises during speeding up or starting thereof. It has been observed that such sanding of the rails greatly reduces and often eliminates the likelihood that one wheel will speed up appreciably more rapidly than another wheel under the above conditions. Preferably the sanding control apparatus is designed to function both during acceleration of the locomotive or other vehicle and upon deceleration thereof during a braking operation; and hence my invention can be said to be applicable to prevent any predetermined variation in rotative speeds of the wheels on railway equipment or the like.

Still another object is to detect a variation from normal rolling condition of a wheel that has been braked, and to do this in a manner other than by comparing its rate of rotation with that of another wheel that has been braked, and more specifically to compare the rotative speed of a braked wheel with that of an unbraked element which is rotated at a speed proportionate to the linear speed of the vehicle or the like.

While in the foregoing discussion and in the following detailed description I refer to controlling the braking means of railway equipment, it is to be understood that my invention is not limited to control of the braking means of railway equipment for it can be employed to control braking means of other equipment on which slippage of a wheel thereof on the surface on which it normally rolls may occur, and furthermore the fundamentals underlying this invention may be employed to control a wide variety of operations in addition to braking operations. It is, therefore, to be understood that the foregoing discussion and following detailed description pertain to preferred embodiments of my invention and hence such discussion and description are not to be taken as a limitation of the invention.

Selected embodiments of my novel invention are illustrated in the accompanying drawings wherein Fig. 1 is a diagrammatic view of one embodiment of my invention associated with a pair of wheels such as are provided at one side of a truck on railway equipment;

Fig. 2 is a vertical sectional view of a switching means employed in the embodiment of my invention illustrated in Fig. 1;

Fig. 3 is a transverse sectional view taken substantially on the line 3—3 on Fig. 2;

Fig. 4 is a sectional detail view taken substantially on the line 4—4 on Fig. 2;

Fig. 5 is a view, similar to Fig. 1, showing another form of my invention;

Fig. 6 is a diagrammatic view of a modification of the form of the invention shown in Fig. 5;

Fig. 7 is a diagrammatic view of a still further modified form of the invention shown in Fig. 5;

Figs. 8 and 9 are diagrammatic views of other forms of my invention;

Fig. 10 is a diagrammatic view, partly in elevation and partly in section, of a modified form of switch that may be employed;

Figs. 11, 12 and 13 are still further diagrammatic views of still other forms of my invention;

Fig. 13A is a diagrammatic view of still another form of switch that may be employed;

Fig. 15 is an elevational view of a conventional rail sanding apparatus as employed on a railway vehicle such as a locomotive having three sets of driving wheels;

Fig. 16 is a partially schematic view of a modification of my invention for effecting operations such as sanding of the rails and brake releasing upon the occurrence of an abnormal condition at the wheels;

Fig. 17 is an elevational view of a modified form of reversing switch for controlling the sanding apparatus shown in Fig. 15; and Fig. 18 is an elevational view of a further modification in which my novel switching means is associated with both a braked wheel and an unbraked wheel.

Figures 14, 14A:
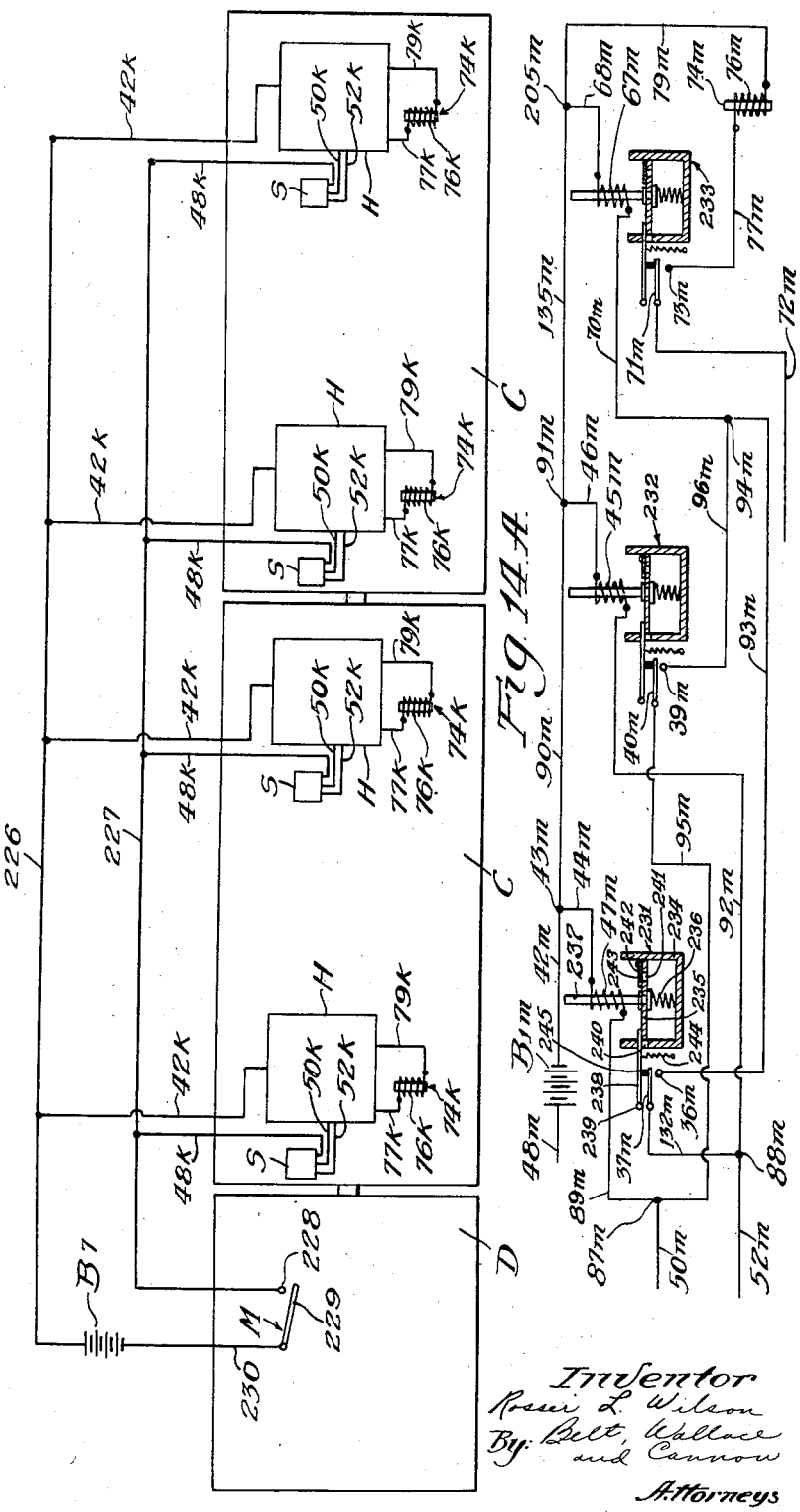
Fig. 14 is a diagrammatic view of an arrangement providing a common control for a plurality of control devices such as that to which this invention pertains.
Fig. 14A is a diagrammatic view of a yet further modified form of my invention.

In the embodiment of my invention shown in Figs. 1 to 4, there is a switch S which includes a pair of rotors 15 and 16 respectively fast to shafts 17 and 18 journaled in suitable bearings in the switch housing 19. A gear 20 fast on the shaft 17 meshes with a gear 21 fast on the shaft 22 which is also journaled in suitable bearings in the housing 19, the gears 20 and 21 having a one-to-one ratio. The shaft 22 extends exteriorly of the housing 19 and one end of a flexible shaft 23 is connected to this end of this shaft, the other end of the flexible shaft being connected to a gear 24 that meshes with a gear 25 connected to a movable element such as the wheel FW for rotation therewith. In the present instance the gears 24 and 25 have a one-to-one ratio but this ratio may be varied as desired. Furthermore, the flexible shaft 23 could be connected to the wheel to derive motion therefrom in other ways, is so desired, as by being directly connected to the axle to which the wheel might be fast. The shaft 18 also extends exteriorly of the housing and one end of a flexible shaft 26 is connected to this end of this shaft, the other end of this flexible shaft being connected to a gear 27 that meshes with a gear 28 connected to a second relatively movable element such as the wheel RW for rotation therewith, this connection of the shaft 18 to the wheel RW being similar to connection of the shaft 17 to the wheel RW.

The wheels RW and FW as illustrated are to be mounted at one side of a truck (not shown) of railway equipment for movement along the rail T. These wheels are adapted to be slowed down by the usual brake apparatus (not shown) provided on railway equipment, which apparatus includes the brake cylinder C to which a fluid under pressure may be supplied through the pipe P. The brake apparatus is not illustrated inasmuch as the particular construction thereof forms no part of my invention which, in the illustrated forms, pertains to controlling the brake apparatus rather than to such apparatus per se. The relation of my invention to the brake apparatus is apparent from the illustration of my novel control means in association with the brake cylinder C to which fluid under pressure is supplied when the wheels FW and RW are to be slowed down.

In the present instance my novel apparatus is employed to control operation of a solenoid-operated check valve 29 and a solenoid-operated vent valve 30, each of which valves is positioned in the pipe P.

A conductor 32 connects one end of the winding 31 of the solenoid of the valve 29 to one end of the winding 33 of the solenoid of the valve 30. Another conductor 34 leads from the other end of the winding 31 to a source of current such as the battery B. Still another conductor 35 leads from this source of current to a contact 36 of the slow-to-release relay SR1, said contact 36 being engaged by the armature 37 of this relay during operation of the relay. A further conductor 38 leads from the armature 37 to a contact 39 of the slow-to-release relay SR2, this contact 39 being engaged by the armature 40 of the relay SR2 during operation of this relay. Yet another conductor 41 leads from the armature 40 to the end of the winding 33 opposite that to which the conductor 32 is connected. Hence, the windings 31 and 33, the armatures 37 and 40, and the contacts 36 and 39 are connected in series so that energization of the windings 31 and 33 is effected, to thereby operate the valves 29 and 30, only when both the armatures 37 and 40 are engaging the contacts 36 and 39, this occurring only when the relays SR1 and SR2 are operative simultaneously.

A conductor 42 leads from a source of current such as the battery B1 to a terminal 43. Another conductor 44 leads from the terminal 43 to one end of the winding 45 of the relay SR2 and a conductor 46 leads from the terminal 43 to one end of the winding 47 of the relay SR1. Still another conductor 48 leads from the source of current B1 to a terminal 49, Fig. 2, in the switch S. A further conductor 50 leads from the end of the winding 47 opposite that to which the conductor 46 is connected to a terminal 51 in the switch S. Yet another conductor 52 leads from the end of the winding 45 opposite that to which the conductor 44 is connected to a terminal 53 in the switch S.

A conductor ring 54 is mounted on the rotor 16 and a pair of conductor rings 55 and 56 is mounted in spaced relation on the rotor 15. The rotors 15 and 16 are preferably made of insulating material and hence the conductor rings 55 and 56 are insulated one from the other. A spring contact 57 mounted on the terminal 49 bears on the conductor ring 54 while spring contacts 58 and 59, respectively mounted on the terminals 51 and 53, respectively bear on the conductor rings 56 and 55. A pair of contact strips 60 and 61 is mounted in the periphery of the rotor 15 in diagrammatically opposite positions. These strips (see Fig. 3) each preferably extend over one-quarter of the periphery of the rotor so that the spacing between adjacent ends thereof is ninety degrees and the extent of each strip over the periphery of the rotor is ninety degrees. A conductor 62 (Fig. 4) interconnects the contact strip 60 with the conductor ring 56 while a conductor 63 connects the contact strip 61 with the conductor ring 55. A spring finger 64 is mounted in the rotor 16 in electrical connection with the conductor ring 54 and extends over that part of the periphery of the rotor 15 on which the contact strips 60 and 61 are provided so that if the rotors 15 and 16 move relative to each other the spring finger 64 alternately engages the contact strips 60 and 61. Thus, these contact strips serve as a commutator while the spring finger 64 serves as a brush.

When the spring finger or brush 64 engages the contact strip 60, circuit is established from the source of current B1 through conductor 48, spring contact 57, conductor ring 54, brush 64, contact strip 60, conductor 62, conductor ring 56, spring contact 58, conductor 50, through winding 47 and conductors 46 and 42 back to the source of current B1 whereupon the slow-to-release relay SR1 is energized. When, however, brush 64 engages the contact strip 61 circuit is established from the source of current B1 through conductor 48, spring contact 57, conductor ring 54, brush 64, contact strip 61, conductor 63, conductor ring 55, spring contact 59, conductor 52, through winding 45 back to the source of current B1 through conductors 44 and 42 whereupon the slow-to-release relay SR2 is energized.

It will be noted that the rotor 15 is connected through shaft 17, gears 20 and 21, shaft 22, flexible shaft 23 and gears 24 and 25 to the wheel FW to rotate therewith and in the same direction and also that the rotor 16 is connected through shaft 18, flexible shaft 26 and gears 27 and 28 to the wheel RW to rotate therewith and in the same direction. Hence when the wheels FW and RW are rotating the rotors 15 and 16 rotate at rates proportionate to the rates of rotation of the respective wheels, and in the present instance, by reason of the one-to-one ratio between the gears of the various sets thereof, the rotors rotate at the same speed as the wheel to which each is respectively connected. It will be recognized, however, that the rotors could be caused to rotate at greater or less speeds or rates than the wheels, it only being important that the rates of rotation of the rotors be proportionate to the rates of rotation of the wheels.

When the rotors 15 and 16 both rotate at the same rate there is no relative movement therebetween and the brush 64 rests on one or the other of the contact strips 60 and 61 or in a space between adjacent ends of these strips, such spaces being of sufficient width and the brush being sufficiently narrow that the brush cannot engage both contact strips at the same time. Of course, whenever the brush 64 engages one or the other of the contact strips 60 or 61, either the slow-to-release relay SR1 or the slow-to-release relay SR2 is energized.

In the normal operation of railway equipment it is believed that there is no slippage at the points of contact of the wheels with the rails and the wheels roll along the rails. During a braking operation effective on the wheels of such equipment the retarding forces react at the rails to slow down the rolling movement of the wheels and so long as the adhesion between each wheel and the rail on which it rolls exceeds the retarding force effective on the wheel, the wheel is retarded without slippage at the contact thereof with the rail. However, when the retarding force in a braking operation exceeds the adhesion between a wheel and the rail on which it normally rolls, the wheel slips on the rail and is thereafter retarded at a rate exceeding that at which it would have been retarded had not the slippage occurred, and as a result the wheel comes to rest prematurely and thereafter slides along the rail.

Thus, where either the rotor 15 or 16 is connected to a wheel which is retarded in the manner just described and the other rotor is connected to a wheel which continues to roll on the rail, it is apparent that the rotor connected to the wheel which is so retarded will move relative to the other rotor in relatively rapid manner whereupon the contactor or brush 64 will engage the contact strips 90 and 91 in rapid succession. The rapidity with which the brush 64 so successively engages the contact strips 60 and 61 is directly proportionate to the magnitude of the difference in the rates of rotation of the wheels. The magnitude of such difference is relatively great when only one of the wheels slips on the rail while the other continues to roll on the rail. However, it has been observed, where several wheels slip on the rails at the same time, that the wheels do not slow down uniformly, this probably being due to varying conditions at the several wheels. Hence, where both the wheels to which the rotors 15 and 16 are respectively connected slip on the rail, it is very unlikely that they will slow down uniformly and hence even in this condition there will be relative movement between the rotors 15 and 16 and the brush 64 will successively engage the contact strips 60 and 61.

As explained heretofore, the contact strips 60 and 61 and the contact brush 64 are so arranged in circuit with the slow-to-release relays SR1 and SR2 that when the brush 64 engages the contact strip or conductive segment 60 the relay SR1 is energized, and when the brush 64 engages the strip 61 the relay SR2 is energized. Each of these relays is maintained energized so long as the brush 64 remains in engagement with the contact strip in circuit with the particular relay and when, for example, the relay SR1 is energized it attracts its armature 37 which thereupon engages the contact 36. Likewise when relay SR2 is energized it attracts its armature 40 which thereupon engages the contact 39. Furthermore, each of these relays, being a slow-to-release relay, remains operative after circuit thereto is broken, that is to say, for a predetermined time after circuit to the relay is broken its armature remains in engagement with the contact engaged by the armature upon energization of the relay, this being an inherent characteristic of a slow-to-release relay.

Hence, when the brush 64 successively engages the contact strips 60 and 61 in such a way that one contact strip is disengaged and the other strip is engaged and the relay in circuit with the second of the strips so engaged is energized in a period of time less than the predetermined time, the relay in circuit with the first of said strips remains operative after circuit thereto is broken, by disengagement of the brush 64 from the contact strip in circuit therewith, then both the relays SR1 and SR2 are simultaneously operative. When this occurs both the armatures 40 and 37 are engaged with their cooperating contacts 39 and 36 and circuit is closed through the windings 31 and 33 whereupon a control operation, such as release of the braking means effecting retardation or slowing down of the wheels, is effected, as will be more fully explained presently.

It is recognized that by reason of conditions encountered in the actual use of railway equipment there will be differences in the rates of rotation of wheels even when all the wheels are normally rolling along the rails. Such differences in rates of rotation may be due to differences in the diameters of the wheels at the lines of contact thereof with the rails. In fact, there may be variations in the diameter of a single wheel at the line of contact thereof with the rail as the wheel rolls along the rail due to movement of the wheel in an axial direction. Since such conditions will exist, it is apparent that all differences in rates of rotation between wheels, to which rotors as 15 and 16 are respectively connected, should not cause these rotors to so rotate relative to each other that a control operation will be brought about. A control operation is not required unless an abnormal condition exists. To avoid a control operation unless an abnormal condition exists, provision is made to care for an extreme condition in actual operation, that is, a condition quite unlikely to be encountered, and the apparatus is so arranged that a control operation will not be effected under such extreme condition. In selecting such an extreme condition, one is chosen that will bracket other similar conditions and improper or undesired effecting of a control operation is therefore avoided.

An example of such an extreme condition is where railway equipment is operating at a speed of one hundred twenty miles per hour and the difference in diameters of the wheels to which the rotors 15 and 16 are connected is one inch at the lines of contact of such wheels with the rail or rails on which they normally roll as, for example, where the diameter of one wheel at the line of contact thereof with the rail is thirty-two inches and the diameter of the other wheel at the line of contact thereof with the rail is thirty-three inches. If a condition such as this prevailed the rotors 15 and 16 would rotate relative to each other even in normal operation and in the absence of slippage on the rail for there would be a difference in rotation therebetween of .634 revolution per second.

As explained above, each of the contact strips 60 and 61 extends over one-fourth of the circumference of the rotor 15 so that there is a ninety degree interval intermediate adjacent ends of the strips as well as a ninety degree extent of the strips. Thus, under the foregoing conditions where there is a difference of .634 revolution per second in the rotation of the rotors 15 and 16 it will require .394 second for the brush 64 to travel from the end of one contact strip 60 or 61 to the adjacent end of the other contact strip. Hence if the slow-to-release relays are timed to remain operative, after circuit thereto is broken, for less than .394 second, the armatures 37 and 44 will not be simultaneously engaged with their cooperating contacts 36 and 39 under the extreme condition mentioned above which is an operating speed of one hundred twenty miles per hour and a difference in the diameters of the wheels at the lines of contact with the rail of one inch.

It is, however, advantageous to afford a safety factor. Hence the slow-to-release relays may be timed to remain operative after circuit thereto is broken for approximately .242 second. In this circumstance, in order for the armatures 37 and 40 to be simultaneously engaged with their cooperating contacts it is necessary for there to be such relative rotation between the rotors 15 and 16 that the brush 64 will move from engagement with one of the contact strips 60 or 61 into engagement with the other of the contact strips in .242 second or less. It will be apparent that this is well beyond the time required for such successive engagement in the extreme condition described above which means that a control operation will not be brought about under normal operating conditions.

However, where slippage occurs between a wheel, to which one of the rotors 15 or 16 is connected, and the rail on which the wheel rolls, and the other wheel does not slip, or even if there is slippage between both wheels to which the rotors are respectively connected, and the rail or rails on which such wheels normally roll, there will be appreciable relative rotation between the rotors 15 or 16. Furthermore, once a wheel slips on the rail it thereafter, so far as its rotative movement is concerned, slows down rapidly and therefore almost or actually simultaneously with wheel slippage relative rotation between the rotors 15 and 16 is set up. Hence as soon as slippage occurs the brush 64 starts moving rapidly from engagement with one contact strip 60 or 61 into engagement with the other of the contact strips. Moreover as soon as the time required for the brush 64 to move from one contact strip to the other is equal to or less than .242 second, both the armatures 37 and 40 will be engaged with their cooperating contacts 36 and 39 whereupon circuit will be closed to the windings 31 and 33 to effect a control operation. Since slippage causes relatively great relative rotation between the rotors 15 and 16, the brush 64 will move from one contact strip to the other in .242 second or less practically simultaneously with the initiation of wheel slippage.

While it is necessary that simultaneous engagement of the armatures 37 and 40 with their cooperating contacts is to be avoided in normal operation, it is desirable to establish this simultaneous cooperation promptly under abnormal conditions, as when slippage occurs, and to illustrate the promptitude with which this would be brought about under abnormal conditions it is possible to effect simultaneous closing of the switches, of which the armatures 37 and 40 are a part, by only having slightly more than ninety degrees of relative rotation between the rotors 15 and 16 for the brush 64 may be near the end of one contact strip at the time rapid relative rotation between the rotors 15 and 16 is initiated and thus the brush need only move slightly more than ninety degrees to engage the other contact strip and effect simultaneous closing of the switches. It will be recognized that such movement may be effected very rapidly and from this it will be seen that the device is quite sensitive to abnormal differences in the rates of rotation between wheels as FW and RW.

To further explain the simultaneous closing of the switches, of which the armatures 37 and 40 are a part, when an abnormal condition arises as, for example, in event of wheel slippage in the course of a braking operation, if the relays SR1 and SR2 have a release time of approximately .242 second and the diameter of both the wheels FW and RW at the lines of contact thereof with the rails is approximately thirty-three inches, (in this circumstance there will be no relative rotation between the rotors 15 and 16 in normal operation) a difference in the rates of rotation of the wheels equivalent to approximately six miles per hour will cause the brush 64 to move from association with one contact strip 60 or 61 into engagement with the other contact strip in approximately .242 second and in proportionately less time as the difference in the rates of rotation increases.

Since it is probable that the rotors 15 and 16 will be rotating relative to each other even in normal operation, a further example of the operation of my novel apparatus, with particular reference to the extreme condition explained above, is now set forth. In such an extreme condition, entailing the connection of the rotors 15 and 16 respectively to wheels having an inch difference in diameter, that is, where one wheel is approximately thirty-two inches in diameter at the line of contact thereof with the rail and the other wheel is approximately thirty-three inches in diameter at the line of contact thereof with the rail, there will normally be, in the absence of wheel slippage on the rail, a difference of approximately .634 revolution per second in the rates of rotation of the wheels at one hundred twenty miles per hour. This is equivalent to a speed of approximately three and three-quarters miles per hour at the circumference of a thirty-three inch wheel. Now if, in such circumstances, the smaller wheel slips on the rail so as to alter the normal difference in the rates of rotation of the wheels, a difference in the rates of rotation between the wheels equivalent to approximately a speed of nine and three-quarters miles per hour at the circumference of a thirty-three inch wheel will cause the brush 64 to move from engagement with one contact strip 60 or 61 into engagement with the other contact strip in approximately .242 second and in proportionately less time as the difference in rates of rotation increases.

From the foregoing it will be apparent that wherever the difference in the rates of rotation between wheels as FW and RW is such that the brush 64 moves from engagement with one contact strip 60 or 61 into engagement with the other strip in less than .242 second, when the relays SR1 and SR2 have a release time of .242 second, then a control operation is initiated. In the present instance the control operation entails energization of the windings 31 and 33 with the result that the check valve 29 is closed and the vent valve 30 is opened. In the course of a braking operation fluid under pressure is supplied through the pipe P to the cylinder C so long as the check valve 29 is open. Thus when in the course of a braking operation the check valve 29 is closed and vent valve 30 is opened the cylinder C is disconnected from the source of fluid under pressure by the closing of the valve 29 and is vented to the atmosphere, in the present instance, by the opening of the valve 30, this venting resulting in reduction of pressure in the cylinder and effecting release of the braking means. Of course, the arrangement could be such as to reduce the effectiveness of the braking means, rather than release thereof, if this were desired.

As soon as the braking means are released or reduced in effectiveness the retarding force effective on the wheels is removed or reduced, as the case may be, and thereupon the wheels tend to resume normal rolling along the rails. When the wheels resume normal rolling along the rails the difference in the rates of rotation therebetween becomes such that the brush 64 no longer moves from engagement with one of the contact strips 60 or 61 into engagement with the other of the contact strips in .242 second or less and therefore the switches of which the armatures 37 and 40 are a part do not remain closed with the result that circuit to the windings 31 and 33 is broken and thereupon the vent valve 30 closes and the check valve 29 opens. If the means operative to bring about the braking operation are still operating when this occurs, the braking means are again rendered effective and if the retarding forces do not again bring about a difference in the rates of rotation of the wheels there will not be such movement of the brush 64 from engagement with one contact strip 60 or 61 into engagement with the other contact strip that the windings 31 and 33 will be energized. If, however, re-application of the braking means again sets up a difference in the rates of rotation between the wheels as FW and RW such that the brush 64 moves from engagement with one of the contact strips 60 or 61 into engagement with the other strip in .242 second or less, the above described operation will be repeated.

It will be apparent from the foregoing that, since the slow-to-release relays SR1 and SR2 are simultaneously rendered operative by reason of a difference in the rates of rotation of wheels as FW and RW, a control operation can be initiated prior to the time one of the wheels prematurely stops rolling and, therefore, where the control operation results in the release of the braking means, sliding of a wheel along a rail may be avoided for when the braking means are released (or reduced in effectiveness) the wheels, being freed of a retarding force, resume normal rolling along the rail.

In the form of my invention illustrated in Fig. 1, there may be such difference in the rates of rotation of wheels as FW and RW that the brush 64 will move from engagement with one contact strip 60 or 61 into engagement with the other contact strip in or less than .242 second to thereby render the relays SR1 and SR2 operative simultaneously but the difference in the rates of rotation may be such that the brush 64 will not be freed from the second of the contact strips so engaged and move back into engagement with the first of the contact strips so engaged in .242 second. In such an instance the first of the relays SR1 or SR2 to be energized might release prior to the time the brush engaged the contact strip in circuit with this particular relay and if this occurred circuit to the windings 31 and 33 would be broken. In a circumstance such as this, a condition might arise where the difference in the rates of rotation of the rotors 15 and 16 would be such that the relays SR1 and SR2 might be rendered operative simultaneously as the brush moved from engagement with one of the contact strips 60 or 61 into engagement with the other of the contact strips but such simultaneous operativeness of the relays would not be maintained until the brush moved from the second of the strips so engaged back into engagement with the first of the strips so engaged. It will be apparent that if conditions such as this arose, circuit would be alternately closed and opened through the windings 31 and 33 with the result that the valves 29 and 30 would both be rendered operative and then inoperative, alternately, which is to say, a control operation would be alternately initiated and interrupted.

In order to avoid such alternate initiation and interruption of a control operation, my novel apparatus may be arranged in the manner illustrated in Fig. 5 wherein rotors similar to the rotors 15 and 16 in a switch Sa are respectively connected to wheels FWa and RWa through flexible shafts 23a and 26a, the switch Sa and the flexible shafts 23a and 26a being similar to the switch S and the flexible shafts 23 and 26 and being adapted for operation in a similar manner. Furthermore, slow-to-release relays SR1a and SR2a, similar to relays SR1 and SR2, are provided as well as a source of current as the battery B1a.

In this instance a conductor 42a leads from the source of current B1a to a terminal 43a and a conductor 44a leads from the terminal 43a to one end of the winding 45a of the slow-to-release relay SR2a. Another conductor 46a leads from the terminal 43a to one end of the winding 47a of the slow-to-release relay SR1a.

As in the case of the switch S, a brush in the switch Sa, corresponding to the brush 64, is connected to the source of current B1a through a conductor 48a while a contact strip in the switch Sa, corresponding to the contact strip 60, is connected to a conductor 50a which leads to the end of the winding 47a opposite to that to which the conductor 46a is connected. Further, a contact strip in the switch Sa, corresponding to the contact strip 61 is connected to a conductor 52a which leads to the end of the winding 45a opposite that to which the conductor 44a is connected. (The switches shown in conductors 50a and 52a are explained hereinafter and for the purpose of the present description should be considered as being closed.)

Slow-to-release relay SR2a includes an armature 40a and a contact 39a and the slow-to-release relay SR1a includes an armature 37a and a contact 36a. A conductor 66 interconnects a contact 39a and the armature 37a. The armature 40a is grounded as indicated at 41a.

In the form of the invention shown in Fig. 5 a third slow-to-release relay SR3 is provided which includes a winding 67, one end of which is connected to a source of current as the battery B2 through a conductor 68, said source of current being grounded at 69. The other end of said winding 67 is connected to the contact 36a through a conductor 70. The relay SR3 includes an armature 71 that is grounded as indicated at 72 and this relay also includes a contact 73 engageable by the armature 71 upon energization of the relay SR3.

A solenoid 74 is provided to control operation of the combined check and vent valve 75 provided in the pipe Pa through which fluid under pressure is supplied to the brake cylinder Ca which corresponds to the brake cylinder C. Upon energization of the solenoid 74 the valve 75 is operated to shut off supply of fluid under pressure to the brake cylinder Ca and to vent said cylinder, the valve 75 therefore performing the function of the valves 29 and 30 shown in Fig. 1.

The solenoid 74 includes a winding 76, one end of which is connected through a conductor 77 to a source of current such as the battery B3 that is grounded as indicated at 78. A conductor 79 interconnects the other end of the winding 76 to the contact 73.

In the form of the invention shown in Fig. 5 when a brush in the switch Sa, corresponding to the brush 64, rests on a contact strip in the switch Sa, corresponding to the contact strip 60, circuit is closed from the source of current B1a through conductor 48a and through the switch Sa, in the manner described in the description of the switch S, to a conductor 50a and through winding 47a and conductors 46a and 42a back to the source of current B1a whereupon the slow-to-release relay SR1a is energized. When, however, a brush in the switch Sa, corresponding to the brush 64, engages a contact strip in the switch Sa, corresponding to the contact strip 61, circuit is closed from the source of current B1a through conductor 48a and through the switch Sa, in the manner described, to conductor 52a and through the winding 45a and conductors 44a and 42a back to the source of current B1a whereupon the slow-to-release relay SR2a is energized.

Energization of the relay SR1a attracts the armature 37a thereof which thereupon engages the contact 36a, this armature remaining in engagement with this contact after circuit to the winding 47a is broken for a predetermined time inasmuch as the relay SR1a is a slow-to-release relay. Thus the armature 37a engages the contact 36a so long as the relay SR1a is operative. Likewise energization of the slow-to-release relay SR2a attracts the armature 40a which thereupon engages the contact 39a, and this armature 40a remains in engagement with this contact after circuit to the winding 45a is broken for a predetermined period of time inasmuch as the relay SR2a is a slow-to-release relay. Hence the armature 40a remains in engagement with the contact 39a so long as the relay SR2a is operative.

It will be noted that engagement of the armature 37a with the contact 36a in the absence of the engagement of the armature 40a with the contact 39a does not close circuit from ground 41a through armature 40a, contact 39a, conductor 66, armature 37a, contact 36a, conductor 70, winding 67, conductor 68, battery B2 to ground 69 to effect energization of the slow-to-release relay SR3. Furthermore, the engagement of the contact 40a with the contact 39a in the absence of the engagement of the armature 37a with the contact 36a likewise does not close the just described circuit to effect energization of the slow-to-release relay SR3.

When, however, a brush in the switch Sa, corresponding to the brush 64, moves from engagement with one of the contact strips in the switch Sa, corresponding to the contact strips 60 and 61, and engages the other contact strip during the time the slow-to-release relay energized by the engagement of said brush with the first of said contact strips still has the armature thereof engaged with the cooperating contact and the relay energized by engagement of said brush with the second of the contact strips has attracted its armature into engagement with its cooperating contact, then the armature 40a will be engaging the contact 39a and the armature 37a will be engaging the contact 36a wherefore circuit to the winding 67 is closed and thereupon slow-to-release relay SR3 energizes.

The slow-to-release relay SR3 has a release time sufficiently prolonged that whenever this relay is energized it remains operative for a period sufficient to insure a control operation of not less than a predetermined period of time. Thus where, as in the present instance, the slow-to-release relay SR3 is arranged to control the supply of fluid under pressure to a brake cylinder as Ca, energization of this slow-to-release relay will initiate release of the braking means of which the cylinder Ca is a part (or will reduce the effectiveness of such braking means) and will maintain this braking means released (or reduced in effectiveness) for not less than a predetermined period of time irrespective of how long the armatures 37a and 40a remain in engagement with their cooperating contacts, this being due to the fact that energization of the slow-to-release relay SR3 initiates an operation which is not interrupted until release of the slow-to-release relay SR3. If the circuit is closed to the winding 67 of the relay SR2 for but a short time the operation under control of the relay SR3 will proceed for a period of time equal to the time of relatively brief energization of the winding 67 plus release time of the relay SR3, and since the energization will be relatively brief the control operation will proceed for substantially the period of time represented by the release time of the relay SR3. In any event, however, the control operation will proceed for a period of time equal to the period for which the winding 67 is energized plus the release time of the relay SR3.

Therefore, by providing the relay SR3 with a release time sufficiently prolonged that a control operation of not less than a predetermined period will proceed each time the relay SR3 is energized it is possible to avoid objectionable alternate initiation and interruption of a control operation such as might result from the utilization of an arrangement such as shown in Fig. 1. Thus where the control operation is the release (or reduction in effectiveness) of the braking means of railway equipment, objectionable alternate release and application of the braking means will be avoided. Of course, even in this arrangement alternate release and application of the braking means might occur under a condition where the winding 67 was only momentarily energized and where, at the expiration of the release time of the relay SR3, both the armatures 37a and 40a would not be engaging their cooperating contacts, but wherein such engagement of the armatures would be effected shortly after release of the relay SR3 which would again result in energization of the relay SR3 and which would of course bring about another release of the braking means.

Release of the braking means by the arrangement illustrated in Fig. 5 is effected whenever the relay SR3 is operative for when this relay is operative the armature 71 thereof is engaged with the contact 73 whereupon circuit is closed from the ground at 72, through armature 71, contact 73, conductor 79, winding 76, conductor 77, battery B3 to ground at 78, which energizes the solenoid 74 and operates the valve 75 to close off the supply of fluid under pressure to the brake cylinder Ca and vent this cylinder to the atmosphere.

It has been explained heretofore that there may be relative movement between rotors as 15 and 16 even in normal operation of railway equipment and it has also been explained that whenever a brush such as the brush 64 is in engagement with a contact strip as the contact strips 60 and 61 the slow-to-release relay in circuit with the contact strip so engaged by the brush will be energized. However, where my novel apparatus is employed to prevent wheel sliding in the course of a braking operation by either releasing the braking means operative during such a braking operation or reducing the retarding forces established by operation of the braking means, the device may be arranged to prevent energization of the slow-to-release relays except during a braking operation by providing a control device such as the switch 80, Fig. 5. In the present instance the switch 80 is pressure-responsive and is connected to the pipe Pa through a pipe 81 ahead of the valve 75 so that so long as there is fluid under pressure in the pipe Pa (which condition will prevail so long as a braking operation is in progress) the switch 80 will be closed. The switch 80, as shown, may be conveniently arranged in the conductors 69a and 52a to thereby disconnect spring contacts as 58 and 59 from relays as SR1a and SR2a so long as the switch 80 was opened, which condition would prevail until fluid under pressure was supplied through the pipe Pa to the brake cylinder Ca during a braking operation. Hence, the relays as SR1a and SR2a could only be energized when a braking operation was in progress which, in the present arrangement, is the only time such relays need be energized.

There might also be conditions where it would be desirable to interrupt relative rotation between rotors as 15 and 16, except when these rotors were to be utilized to effect a control operation, as where the control operation brought about by predetermined operation of the rotors 15 and 16 relative to each other is the release of braking means or the reduction of the retarding force established by operation of such means, the rotors would be rendered operative only when a braking operation is in progress. To this end a fluid-responsive clutch 82 would be interposed between the flexible shaft as 23a and a shaft corresponding to the shaft 22, and another fluid-responsive clutch 83 would be interposed between the flexible shaft as 26a and the shaft as 18. A pipe as 84 connected to the pipe Pa ahead of the valve 75 leads to the clutch 82 through a branch pipe 85 and to the clutch 83 through a branch pipe 86 so that whenever fluid under pressure is supplied to the brake cylinder as Ca through a pipe as Pa the clutches 82 and 83 are engaged to thereby connect a rotor as 15 with a flexible shaft as 23a and a rotor as 16 with a flexible shaft as 26a.

As will be apparent to those skilled in the art, a switch such as the switch 80 may be employed with or without clutches as 82 and 83 and likewise clutches as 82 and 83 could be employed with or without a switch as 80, the use of these devices being dictated by the conditions under which my novel apparatus is used.

A further modified form of my invention is shown in Fig. 6 and herein a switch Sb is provided which is similar to the switch S and which includes rotors that in the present instance may be operated at rates proportionate to the rates of rotation of wheels of railway equipment through flexible shafts as 23b and 26b that correspond to the shafts 23 and 26.

A source of current B1b is provided and a conductor 48b leads from this source of current to a terminal in the switch Sb corresponding to the terminal 49 in the switch S. Conductors 50b and 52b respectively lead from terminals in the switch Sb corresponding to the terminals 51 and 53 in the switch S. The conductor 50b leads to a terminal 87 while the conductor 52b leads to a terminal 88. Three slow-to-release relays SR1b, SR2b and SR3b are provided.

A conductor 42b leads from the source of current as the battery B1b to a terminal 43b and a conductor 46b leads from the terminal 43b to one end of the winding 47b of slow-to-release relay SR1b, a conductor 89 connecting the other end of this winding to the terminal 87. A conductor 90 leads from terminal 43b to a terminal 91 and a conductor 44b leads from the terminal 91 to one end of the winding 45b of the slow-to-release relay SR2b, a conductor 92 leading from the other end of this winding to the terminal 88. A conductor 132 interconnects the armature 37b with the terminal 88. A conductor 93 leads from the contact 36b to a terminal 94. A conductor 95 interconnects the armature 40b with the terminal 87 while a conductor 96 interconnects the contact 39b with the terminal 94. A conductor 70b leads from the terminal 94 to one end of the winding 67b of the slow-to-release relay SR3b and a conductor 68b leads from the other end of this winding to the terminal 91. The armature 71b of the relay SR3b is grounded as indicated at 72b while the contact 73b is connected through a conductor 79b to one end of the winding 76b of a solenoid 74b, the other end of this winding being connected through a conductor 77b to a source of current as the battery B3b which is grounded as at 78b.

So long as the slow-to-release relays SR1b, SR2b and SR3b are operative the armatures 37b, 40b and 71b are respectively engaged with the contacts 36b, 39b and 73b.

In the switch Sb there is a brush similar to the brush 64 and contact strips similar to the contact strips 60 and 61. When this brush engages a contact strip similar to the contact strip 60 circuit is closed from the conductor 48b to the conductor 50b and when this brush engages a contact strip similar to the contact strip 61 circuit is closed from the conductor 48b to the conductor 52b.

When circuit is closed from the source of current as the battery B1b through conductor 48b, switch Sb, conductor 50b to terminal 87, and through conductor 89, winding 47b and conductors 46b and 42b back to the source of current B1b, the slow-to-release relay SR1b is energized and the armature 37b thereof is engaged with the contact 36b. In normal operation this does not close circuit to the winding 67b since circuit to the conductor 52b is not closed at the same time circuit to the conductor 50b is closed and, therefore, the engagement of the armature 37b with the contact 36b does not close circuit from terminal 88 through conductor 132, armature 37b, contact 36b, conductor 93 to terminal 94. While closing of circuit to conductor 50b also closes circuit to conductor 95, circuit is not closed through armature 40b, contact 39b and conductor 96 to terminal 94 unless relay SR2b is operative to engage armature 40b with contact 39b.

When circuit is closed to conductor 52b, it is also closed to terminal 88 and in normal operation this does not close circuit through conductor 132, armature 37b, contact 36b and conductor 93 to terminal 94 for at this time armature 37b will be disengaged from contact 36b. However, closing of circuit to conductor 52b also closes circuit to conductor 92 and through winding 45b, conductors 44b, 90 and 42b, circuit is closed back to the source of current B1b whereupon the winding 45b of relay SR2b is energized and the armature 40b is engaged with the contact 39b.

In the operation of the device when the brush in the switch Sb corresponding to the brush 64 in the switch S moves from engagement with one contact strip in the switch Sb, similar to one of the contact strips 60 or 61, into engagement with the other contact strip in the switch Sb, similar to the contact strips 60 or 61, as the case may be, in a period of time such that the slow-to-release relay in circuit with the first of the so engaged strips is still operative at the time the brush engages the other of the contact strips, circuit will be closed to the terminal 94.

Thus, if the slow-to-release relay SR1b were the first of the two relays to be energized and is the one which remains operative, then the armature 37b thereof is engaging the contact 36b wherefore when the brush engages the one of the contact strips that closes circuit to conductor 52b, circuit will be closed from terminal 88 through conductor 132, armature 37b, contact 36b and conductor 93 to terminal 94. At this same time the winding 45b will be energized to engage the armature 40b with the contact 39b and if, therefore, the brush similar to the brush 64 moves from engagement with the second of the contact strips to be engaged into engagement with the first of the contact strips to be engaged prior to the time the relay SR2b releases, flow of current to the terminal 94 will be established from terminal 87, through conductor 95, armature 40b, contact 39b and conductor 96.

In either event it will be noted that when both the slow-to-release relays SR1b and SR2b are operative circuit is closed to the terminal 94 from the source of current B1b through conductor 48b and switch Sb and either through conductor 50b, terminal 87, conductor 95, armature 40b, contact 39b and conductor 96 or through conductor 52b, terminal 88, conductor 132, armature 37b, contact 36b and conductor 93. From terminal 94 circuit is closed through conductor 70b, winding 67b and conductors 68b, 90 and 42b back to the source of current B1b whereupon the slow-to-release relay SR3b is rendered operative to attract its armature 71b into engagement with the contact 73b whereupon circuit is closed through the winding 76b of the solenoid 74b from ground at 72b through armature 71b, contact 73b, conductor 79b, winding 76b and conductor 77b to the source of current as the battery B3b and to ground at 78b. This energizes the winding of the solenoid 74b which may be arranged to operate a combined vent and check valve similar to the combined vent and check valve 75, Fig. 5, and thereafter a control operation will proceed in the manner described in connection with the description of Fig. 5.

The arrangement shown in Fig. 6 is quite similar to that shown in Fig. 5 but has an advantage over the arrangement shown in Fig. 5 in that the relay SR3b starts to energize as soon as a brush similar to the brush 64 engages a second contact strip, while the slow-to-release relay energized by engagement of the brush with the first of the strips is still operative, whereas in the arrangement shown in Fig. 5 it is necessary that the relay in circuit with the second of the strips so engaged be energized before circuit to slow-to-release relay SR3 is closed. In other respects the arrangements shown in Figs. 5 and 6 operate in an identical manner.

The form of my invention shown in Fig. 7 may be used either with the arrangement shown in Fig. 5 or the arrangement shown in Fig. 6. If used with the arrangement shown in Fig. 5, the conductor 70c, Fig. 7, would lead from a contact corresponding to the contact 36a to winding 67c and through conductor 68c and battery B2c to ground at 69c. If used with the arrangement shown in Fig. 6, the conductor 70c would lead from a terminal corresponding to the terminal 94, Fig. 6, through winding 67c, conductor 68c and the conductor shown in broken lines and indicated by c in Fig. 7 to a terminal corresponding to the terminal 91 and in this instance conductor 68c would not be connected to a source of current as B2c as shown in full line in Fig. 7. Thus in the arrangement shown in Fig. 7 the slow-to-release relay SR3b is energized whenever an abnormal condition exists and the energization of this relay engages the armature 71c with the contact 73c to ground the conductor 101.

In the present instance the conductor 101 leads to a terminal 97 and when conductor 101 is grounded circuit is closed through a conductor 98, armature 99, contact 100, conductor 79c, winding 76c, conductor 77c, through the source of current B3c to ground at 78c. The winding 76c is part of a solenoid 74c which corresponds to, is for the same purpose as, and operates in the same manner as the solenoids 74 and 74b.

If in the operation of the arrangement shown in Fig. 7 the solenoid 74c is maintained operative for more than a predetermined period of time, then circuit thereto is broken. The predetermined period of time for which the solenoid 74c may continue to be operative will be of sufficient length to enable an intended control operation to be completed. Such a control operation, as explained above, may be release of braking means or a reduction in the effectiveness of such means. When, however, operation of the solenoid 74c is not interrupted at the end of such predetermined period of time, the control operation should nevertheless be interrupted because this will be indicative of an inadvertent and improper condition. To this end a slow-to-energize relay SE1 is provided and the aforesaid armature 99 and contact 100 are a part of this relay.

The slow-to-release relay SE1 includes a winding 102, one end of which is connected to the terminal 97 through a conductor 103, the other end of this winding being connected to a source of current as the battery B4 through a conductor 104, said battery being grounded at 105. The slow-to-energize relay SE1 is such that the armature 99 thereof is not attracted from engagement with the contact 100 into engagement with the contact 106 until a predetermined time after circuit to the winding 102 of this relay has been closed by the engagement of armature 71c with contact 73c.

Thus when the armature 71c is engaged with the contact 73c to apply ground on the winding 76c and thereby render the solenoid 74c operative, circuit is also closed from ground at 72c through armature 71c, contact 73c, conductor 101, terminal 97 and thence through conductor 103, winding 102 and conductor 104 to battery B4 and ground at 105. This energizes winding 102 but the armature 99 of the relay SE1 is not attracted until circuit has been closed through the winding 102 for a predetermined time. When, however, circuit remains closed through the winding 102 for a predetermined period of time, the armature 99 is attracted from engagement with the contact 100 into engagement with the contact 106 and thereupon circuit is closed from ground at 105 through the source of current B4, conductor 104, winding 102, conductor 103, terminal 97, conductor 98, armature 99, contact 106, conductor 107 to fixed contact 108 and through movable contact 109 to ground at 110 whereby a stick or holding circuit is closed through winding 102 to maintain the relay SE1 energized.

Such disengagement of armature 99 from contact 100 breaks circuit to winding 76c wherefore the solenoid 74c is rendered inoperative. The solenoid 74c will remain inoperative and no further control operations will be effected until the stick circuit through winding 102 is broken. This stick circuit can only be broken by manually disengaging the movable contact 109 from the fixed contact 108 and this will not be done until the reason why circuit remained closed to the winding 76c for greater than a predetermined period of time has been ascertained. Thus by the arrangement shown in Fig. 7 my device may be rendered inoperative until manually rendered operative and this will occur whenever a control operation is prolonged for greater than a predetermined period of time.

Obviously it will be advantageous to indicate the disengagement of the armature 99 from the contact 100 and the engagement thereof with the contact 106. Hence the slow-to-energize relay SE1 is provided with another armature 111 that is adapted to engage the contact 112 simultaneously with the engagement of the armature 99 with the contact 106. The armature 111 is grounded as indicated at 113 and a conductor 114 leads from the contact 112 to a terminal 115. Thus circuit is closed to terminal 115 each time a stick circuit is closed for relay SE1.

A circuit from ground is closed from the terminal 115 through conductor 116, a visible signal such as the lamp L and conductor 117 to a source of current as the battery B5 each time terminal 115 is grounded by the engagement of armature 111 with contact 112, said source of current B5 being grounded at 118. A conductor 119 leads from the terminal 115 to an audible signal such as the buzzer N which is connected to a source of current as the battery B6 through a conductor 120, said battery being grounded as indicated at 121. Thus the buzzer N is rendered operative each time terminal 115 is grounded.

Thus the visible signal L and the audible signal N are rendered operative whenever the solenoid 74c is rendered inoperative by the disengagement of the armature 99 from the contact 100. While it may be advantageous to maintain both the audible signal N and the visible signal L operative once circuit thereto is closed, there may be circumstances where it will be desirable to interrupt circuit to one or the other or both of these signals and to this end a manually operable switch may be provided for this purpose, such a switch being indicated at 122 and being provided in the conductor 119 to enable the audible signal N to be rendered inoperative by the manual opening of this switch. Of course, a similar switch could be provided in the conductor 116 to render the visible signal L inoperative or such a switch could be provided in the conductor 114 so that both of the signals could be rendered inoperative, if desired.

The arrangement shown in Fig. 8 is similar to that shown in Fig. 6 except that the arrangement shown in Fig. 8 enables a single source of current to be utilized and a different type of switch is employed.

The switch shown in Fig. 8 includes a shaft 18d suitably journaled in the switch housing (not shown) and this shaft is to be connected to a flexible shaft or the like corresponding to the flexible shaft 26. A shaft 17d is also provided and which is also to be journaled in suitable bearings in the switch housing and a flexible shaft similar to the flexible shaft 23 is to be connected thereto. The flexible shafts used with the shafts 17d and 18d, Fig. 8, are to be arranged, for example, to cause these shafts to rotate at rates proportionate to the rates of rotation of, and in the same direction as, different wheels of railway equipment or the like, although these shafts need not necessarily rotate in the same directions as the wheels.

In this switch a conductive disc 123 is mounted on the shaft 18d but insulated therefrom and stationary spring contacts 124 engage this disc. Conductive discs 125 and 126 are mounted on but insulated from the shaft 17d, and stationary contacts 127 and 128 respectively engage the discs 125 and 126. A plate 129 of insulating material is also fast on the shaft 17d and carries contact strips 60d and 61d spaced from each other and of an extent similar to the contact strips 60 and 61. A spring contact 64d is carried by the bracket 130, fast on the shaft 18d, and this spring contact is adapted to successively engage the strips 60d and 61d in a manner similar to that in which the brush 64 engages the contact strips 60 and 61. The spring contact 64d is connected to the disc 123 through a conductor 131. The contact strips 60d are connected to the disc 126 through a conductor 62d while the contact strips 61d are connected to the disc 125 through a conductor 63d.

In use the shafts 17d and 18d are operated at rates proportionate to the rates of rotation of different wheels on railway equipment or the like and so long as the relative rotation between these shafts is such that the spring contacts 64d do not disengage one of the contact strips 60d or 61d and engage the other of the contact strips in a time equal to or less than the release time of the slow-to-release relays SR1d and SR2d, the slow-to-release relays SR1d and SR2d are not operative simultaneously, wherefore circuit is not closed to the slow-to-release relay SR3d. When, however, the spring contact 64d disengages one contact strip 60d or 61d and engages the other contact strip prior to the release of the slow-to-release relay energized by the engagement of the spring contact with the first of such strips, then circuit is closed to the slow-to-release relay SR3d.

Assuming that the spring contact 64d is engaging contact strip 60d, as shown in Fig. 8, then circuit is closed from the source of current B1d through conductor 134 to terminal 133 and from there through conductor 48d to spring contact 124 and thence through disc 123, conductor 131, spring contact 64d, contact strips 60d, conductor 62d, disc 126, spring contacts 128 and conductor 50d to terminal 87d. From terminal 87d circuit is closed through conductor 89d, winding 47d and conductors 46d and 42d back to the source of current B1d whereupon slow-to-release relay SR1d is rendered operative to engage the armature 37d thereof with contact 36d. This, however, does not close circuit to the winding 67d of slow-to-release relay SR3d since circuit to conductor 52d is not closed at this time. Circuit is also closed from terminal 87d through conductor 95d to armature 40d which, however, at this time is disengaged from contact 39d wherefore circuit is not closed to the winding 67d.

If, however, the spring contact 64d moves from engagement with the contact strip 60d into engagement with the contact strip 61d prior to the time slow-to-release relay SR1d has released its armature 37d, then circuit is closed from the source of current B1d through conductors 134 and 48d, spring contact 124, disc 123, conductor 131, spring contact 64d, contact strip 61d, conductor 63d, disc 125, spring contacts 127 and conductor 52d to terminal 88d. From terminal 88d circuit is closed through conductor 132d, armature 37d, contact 36d, conductor 93d to terminal 94d. Circuit is also closed at this time from terminal 88d through conductor 92d, winding 45d and conductors 44d, 90d and 42d back to the source of current B1d wherefore the winding 45d of relay SR2d is energized. If, therefore, the spring contact 64d moves from engagement with the contact strip 61d into engagement with the contact strip 60d prior to the time relay SR2d has released its armature 40d, circuit will be closed from terminal 87d (to which circuit will be closed in the manner above described) through conductor 95d, armature 40d, contact 39d and conductor 96d to terminal 94d.

In either event when circuit is closed to terminal 94d, winding 67d is energized, current flowing from terminal 94d, through conductor 70d, winding 67d and conductors 68d, 135, 90d and 42d back to the source of current B1d whereupon slow-to-release relay SR3d is energized.

Slow-to-release relay SR3d is similar to and operates in the same manner as slow-to-release relay SR3 and when energized attracts its armature 71d into engagement with contact 73d whereupon circuit is closed from the source of current B1d through conductor 134, terminal 133, conductor 72d, armature 71d, contact 73d, conductor 77d, winding 76d and conductors 79d, 135, 90d and 42d back to the source of current B1d. This renders solenoid 74d operative and this solenoid operates in the manner above described with reference to solenoid 74 to operate a valve similar to the valve 75 for the purpose and in the manner above described.

A modification of the form of the invention shown in Fig. 8 is illustrated in Fig. 10, the difference between Figs. 8 and 10 residing in the form of switch employed.

In the form of the invention shown in Fig. 10, shafts 17e and 18e are suitably journaled in bearings in the switch housing (not shown) and flexible shafts, corresponding to the flexible shafts 23 and 26, are connected to the shafts 17e and 18e so that they may be rotated at rates proportionate to the rates of rotation of, and in the same direction as, the wheels of railway equipment or the like although, here again, the shafts need not rotate in the same directions as the wheels. The shaft 18e, however, carries a substantially cup-shaped member 130e of insulating material and contact strips 60e and 61e are mounted on the inner periphery of the member 130e, said strips being of a length similar to and being spaced similarly to the contact strips 60 and 61 in the switch S. A conductor 63e connects the strip 61e with a disc 125e, similar to the disc 125 and on which the brush 127e bears. A conductor 62e interconnects the strip 60e with a disc 126e, similar to the disc 126 and on which the brush 128e bears. An annular body 129e, fast on the shaft 17e, is disposed within the substantially cup-shaped member 130e and carries a brush 64e that is urged outwardly by a spring 136 so that the brush will successively ride over the contact strips 60e and 61e upon relative rotation between the shafts 17e and 18e. A conductor 131e interconnects the brush 64e with the disc 123e, similar to the disc 123, and on which the brush 124e bears.

The switch shown in Fig. 10 operates in a manner similar to that hereintofore described and could be used in place of any of the switches thus far described. If this were done, for example, insofar as Fig. 8 is concerned, the conductor 48e would lead to a terminal similar to the terminal 133, Fig. 8, while the conductors 50e and 52e would respectively lead to terminals corresponding to the terminals 87d and 88d, Fig. 8. It is obvious that with the switch shown in Fig. 10 connected in this manner it would operate similarly to the switch shown in Fig. 8 to bring about a control operation in the above described manner.

A further modified form of my invention is shown in Fig. 11 and herein a somewhat different circuit and a somewhat different switch are illustrated. The circuit shown could be used with any of the switches thus far described, and the switch shown herein could be used with any of the circuits thus far described. In the form of my invention shown in Fig. 11, shafts 17f and 18f are provided which in the manner previously described may be connected to the wheels of railway equipment to rotate at rates proportionate to the rates of rotation of such wheels and in the same direction, if desired.

A cam member 138 is slidably but non-rotatably mounted on the shaft 18f while a cam member 139 is fast on the shaft 17. The cam members 138 and 139 have complementary cam surfaces 140 and 141 and a spring 142, disposed about the shaft 18f between the cam member 138 and the collar 143 fast on this shaft, urges the cam surfaces 140 and 141 into cooperating relation. When the cam surfaces are cooperating with each other in the manner shown in Fig. 11 the cam member 138 permits the rider 137 to assume the position shown wherein the contact 64f, controlled by the rider 137, engages the contact 60f. However, if the cam surfaces move relative to each other so that the high portions of the cam surface 140 are opposite the high portions of the cam surface 141, then the cam member 138 engages the rider 137 and moves the contact 64f from engagement with the contact 60f into engagement with the contact 61f.

Assuming that the shafts 17f and 18f have been rotating at substantially the same rate and that the cam surfaces 140 and 141 are cooperating with each other in the manner shown in Fig. 11, then the contact 64f engages the contact 60f and circuit is closed from the source of current B1f through conductor 134f, terminal 133f, conductor 48f, contact 64f, contact 60f, conductor 50f, to armature 40f which at this time will be disengaged from contact 39f and hence circuit is not closed in this instance to any of the slow-to-release relays SR1f, SR2f or SR3f.

When, however, the high portions of the cam surfaces 140 and 141 are cooperating with each other, circuit is closed from the source of current B1f through conductor 134f, terminal 133f, conductor 48f, contact 64f, contact 61f, conductor 52f to terminal 88f and from terminal 88f through conductor 92f and winding 45f, back through conductors 44f and 42f to the source of current B1f whereupon slow-to-release relay SR2f is energized and the armature 40f is engaged with the contact 39f. This, however, does not close circuit to the winding 47f if the high portions of the cam surfaces 140 and 141 are still opposite each other.

If, however, the relative rotation between the shafts 17f and 18f is such that immediately after the high portions of the cam surfaces 140 and 141 have been aligned with each other, the cam surfaces move into relationship shown in Fig. 11, then the contact 64f engages the contact 60f and thereupon circuit is closed from the source of current B1f through conductor 134f, terminal 133f, conductor 48f, contact 64f, contact 60f, conductor 50f to armature 40f. If the contact 64f engaged the contact 60f prior to the time the slow-to-release relay SR2f has released the armature 40f from the contact 39f, then circuit is closed through conductor 66f, winding 47f, and conductors 46f, 90f, and 42f back to the source of current B1f whereupon slow-to-release relay SR1f is energized and armature 37f thereof is engaged with contact 36f.

Hence, if the relative rotation between the shafts 17f and 18f continues and the high portions of the cam surfaces 140 and 141 move into alignment with each other prior to the time the slow-to-release relay SR1f has released armature 37f from contact 36f, then circuit is closed to terminal 88f in the manner above described and from terminal 88f through conductor 132f, armature 37f, contact 36f, conductor 70f, winding 67f, and conductors 68f, 135f, 90f and 42f back to the source of current B1f whereupon slow-to-release relay SR3f energizes.

It will be apparent from the foregoing description that the arrangement shown in Fig. 11 requires the successive engagement of two slow-to-release relays in less time than the release times of such slow-to-release relays in order that the slow-to-release relay SR3f will be operative. Hence this arrangement requires that the need for a control operation be prevalent for a greater period of time than any heretofore described. When, however, the slow-to-release relay SR3f is energized it operates in a manner similar to that described with reference to the slow-to-release relay SR3, Fig. 5, and the solenoid 74f is rendered operative to operate a valve similar to the valve 75, Fig. 5, or to bring about any other desired control operation, circuit being closed to the winding 76f of the solenoid 74f so long as slow-to-release relay SR3f is operative from the source of current B1f through conductor 134f, terminal 133f, conductor 72f, armature 71f, contact 73f, conductor 77f, winding 76f, and back through conductors 79f, 135f, 90f and 42f to the source of current B1f.

A still further modified form of switch is shown in Fig. 13A and herein shafts 17g and 18g are provided which are adapted to be operated at rates proportionate to the rates of rotation of wheels of railway equipment or other rotative devices to be controlled, and hence these shafts are similar to corresponding shafts previously described. Three discs 123g, 125g and 126g are mounted on the shaft 18g to rotate therewith but these discs are insulated from this shaft. Brushes 124g, 127g and 128g respectively bear on these discs and conductors 48g, 52g and 50g are respectively connected to these brushes. These conductors correspond to the conductors hereinabove described and numbered 48, 52 and 50, both with and without suffixes. Contact strips 60g and 61g are carried by the shaft 18g as are flexible plates 129g and 129g'. The contact strip 61g is connected to the disc 125g by a conductor 63g, the contact strip 60g is connected to the disc 126g by a conductor 62g, while the flexible plates 129g and 129g' are connected to the disc 123g by a conductor 131g. A plate 145 is fast on the shaft 17g and carries a pair of rollers 146 and 147, of which roller 146 is successively engageable with plungers 148 and 149 in the disc 150 that is fast on the shaft 18g. The roller 147 is a balance roller to avoid unnecessary vibration in the devices.

When the shafts 17g and 18g rotate relative to each other the roller 146 so successively engages the plungers 148 and 149 and forces these plungers inwardly that first the flexible plate 129g is engaged with contact strip 60g and then the plate 129g' is engaged with the contact strip 61g. When this successive engagement of these flexible plates with the contact strips 60g and 61g is such that the engagement occurs at intervals of time equal to or less than the release time of slow-to-release relays in circuit with the conductors 52g and 50g, as above described in connection with conductors numbered 48, 52 and 50, both with and without suffixes, then operation of a solenoid such as the solenoid 74f (or the solenoids 31 and 33) is brought about for the purpose hereinabove described, for it will be recognized that the engagement of the flexible plate 129g with the contact strip 60g closes circuit from conductor 48g to conductor 50g while engagement of the flexible plate 129g' with the contact strip 61g closes circuit from conductor 48g to conductor 52g.

The arrangement shown in Fig. 13 differs from that hereinabove described inasmuch as only one slow-to-release relay is employed to determine whether or not a control operation is to be instituted. Furthermore, a somewhat different type of switch is illustrated in Fig. 13.

The switch shown in Fig. 13 includes shafts 17h and 18h similar to shafts 17 and 18 and which are operated similarly to said shafts 17 and 18. A cam member 138h is fast on the shaft 18h while a disc 139h is fast on the shaft 17h. The cam member 138h embodies a cam surface 140h including high and low portions. A rocker 151 is pivotally mounted at 152 on the disc 139h and includes a rider 153 that is urged into engagement with the cam surface 140h by the action of a spring 154 on a plunger 155, said spring and plunger being mounted in the shaft 17h and shown in Fig. 13. A guide 156 is mounted on the disc 139h to insure proper rotation of the rocker 151 with the disc 139h. The plunger 155 includes a stem 157 on which the rider 137h bears.

When the rider 153 rides on the high part of the cam surface 140h, the stem 157 acts on the rider 137h to hold the contact 64h in engagement with the contact 60h. When, however, the rider 153 moves onto a low part of the cam surface 140h, the stem 157 so cooperates with the rider 137h that the contact 64h engages the contact 61h.

In the switches shown in Figs. 11 and 13, the contacts 64f and 64h may remain in engagement with one or the other of their two cooperating contacts for relatively protracted periods in normal operation of the device but, of course, when there is relative rotation between the shafts and the members mounted on these shafts, the contacts 64f and 64h move from engagement with one cooperating contact into engagement with the other cooperating contact in a relatively rapid manner for when there is appreciable relative rotation between the shafts as 17f and 18f it is indicative, in the present instance, of a wheel sliding condition, and, therefore, a control operation is to be initiated. Of course, due to sharpness of the inclination between the two different cam surface levels of the device shown in Fig. 13, the shift of contact 64h from either contact 60h or 61h to the other will occur more rapidly than in the arrangement shown in Fig. 11 for the same difference in the rates of rotation between the shafts. Furthermore, it is intended that by reason of such sharpness of inclination between the cam surfaces the contact 64h will move from either contact 60h or 61h to the other, or vice versa, in such time that there will be little if any interval between such engagements.

In normal operation so long as the contact 64h remains in engagement with the contact 60h circuit is closed from the source of battery B1h through conductor 134h, terminal 133h, conductor 48h, contact 64h, contact 60h conductor 50h to terminal 87h. This closes circuit to conductor 158 and winding 159 of slow-to-energize relay SE2 for this completes circuit back to the battery B1h through conductor 160, terminal 161, conductor 162, terminal 163 and conductor 42h. Relay SE2 being a slow-to-energize relay may therefore energize in normal operation to attract its armature 164 from normal engagement with the contact 165 but this is without effect in normal operation. Furthermore, when circuit is closed to terminal 87 circuit is also closed to conductor 168 and terminal 169. From terminal 169 circuit is then closed through conductor 95h to armature 166 which remains disengaged from contact 167 until relay R1 is energized. Closing of circuit to terminal 169 also closes circuit through conductor 170, winding 171 of slow-to-release relay SR4, conductor 172, terminal 173, conductor 174, terminal 161, conductor 162, terminal 163 and conductor 42h back to the source of current B1h. This energizes slow-to-release relay SR4 whereupon the armature 175 thereof is attracted into engagement with contact 176. In normal operation the engagement of armature 175 with contact 176 is without effect since circuit will not be closed from source of current B1h through conductor 134h, terminal 133h, conductor 48h, contact 64h, contact 61h and conductor 52h to armature 175 and hence relay R1 is not energized, assuming shafts 17h and 18h are rotating at equal rates.

It has been explained hereinabove that contact 64h is rapidly disengaged from contact 60h and is almost instantaneously moved into engagement with contact 61h whenever the rider 153 moves from the high portion of the cam surface 140h and onto the low portion thereof. It has also been stated that in normal operation there is apt to be a slight difference in the rates of rotation of the wheels to which the rotating elements as 138h and 139h of the switch assembly are respectively connected, due, for example, to a discrepancy in diameters of these wheels. Therefore, it may happen that in normal operation the contact 64h will become disengaged from contact 60h and will move into engagement with contact 61h before the slow-to-release relay SR4 has been deenergized by the separation of the contacts 60h and 64h. This will complete a circuit from source of current B1h through contacts 64h and 61h to armature 175, as just described, and thence through contact 176, conductor 177, terminal 178, conductor 179, winding 180 of relay R1, conductor 181, terminal 173, conductor 174, terminal 161, conductor 162, terminal 163, and conductor 42h back to the source of current B1h, whereupon relay R1 is energized.

The slow-to-release relay SR4 also includes an armature 182 which remains in engagement with the contact 183 so long as the armature 175 remains in engagement with the contact 176. Hence, at the time circuit is closed through the winding 180 of relay R1, circuit is also closed from battery B1h through conductor 134h, terminal 133h, conductor 184, terminal 185, conductor 186, armature 182, contact 183, conductor 187, armature 164 and contact 165, inasmuch as slow-to-energize relay SE2 is not energized at this time, and through conductor 188 to terminal 189. Since at this time relay R1 is energized, circuit is now closed from terminal 189, through conductor 190, contact 191, armature 192 of relay R1 through conductor 193 to terminal 178 whereupon a stick or holding circuit for relay R1 is established.

As will be shown more fully hereinafter, the energization of relay R1 is without effect upon the remainder of the apparatus unless slow-to-release relay SR4 maintains its armatures 175 and 182 in engagement with their respective contacts 176 and 193 throughout the entire interval between two successive engagements of the contact 64h with contact 60h. During normal operation this interval is always greater than the deenergization time of the relay SR4, so that relay R1 will be deenergized, as a result of the disengagement of armatures 175 and 182 from their respective contacts upon deenergization of relay SR4, prior to the time contact 64h again engages contact 60h. Hence, during normal operation the armature 166 of relay R1 will be disengaged from its contact 167 at all times when contacts 60h and 64h are in engagement with each other, and therefore circuit is not completed beyond armature 166.

However, when an abnormal condition arises and the shafts 17h and 18h start to rotate relative to each other at such a rate that after the contact 64h has engaged the contact 61h and energized the relay R1 the contact 64h is caused to engage the contact 60h prior to the time the slow-to-release relay SR4 has released its armatures 175 and 182, then circuit is closed from conductor 168, terminal 169, conductor 95h, armature 166 of relay R1, which relay will be held energized by the above traced stick circuit, and contact 167, conductor 194, terminal 195, conductor 196, winding 197 of relay R2, conductor 198, terminal 199, conductor 200, terminal 163 and conductor 42h back to the battery B1, whereupon relay R2 is energized. Furthermore, circuit is closed from the source of current B1h through conductor 134h, terminal 133h, conductor 48h, contact 64h, contact 60h, and conductor 50h to terminal 87h to again initiate energization of slow-to-energize relay SE2 through conductor 158 as above described.

The above described energization of relay R2 closes a stick or holding circuit therefor from terminal 189 through conductor 201, contact 202, armature 203 of relay R2 which will be engaged with contact 202, upon energization of said relay R2, and through conductor 204 to terminal 195. Hence, so long as slow-to-energize relay SE2 does not attract its armature 164 and so long as slow-to-release relay SR4 does not release its armature 182, the relays R1 and R2 will be held energized. However, upon the energization of slow-to-energize relay SE2 or the release of armature 182 of slow-to-release relay SR4, at the end of a period of operation of this relay, the stick circuits for the relays R1 and R2 are broken and thereupon these relays release.

So long as the relay R2 remains energized the armature 71h thereof is held in engagement with the contact 73h whereupon circuit is closed through conductor 77h, winding 76h, conductor 79h, terminal 199, conductor 200, terminal 163 and conductor 42h back to the source of current B1h wherefore the winding 76h is energized to render the solenoid 74h operative. Solenoid 74h is similar to solenoids heretofore described bearing this reference character with or without suffixes and therefore energization of the winding 76h brings about a control operation as above described.

In Figs. 9 and 12 I have illustrated arrangements wherein switches such as those which have been thus far described may be supplemented by means for generating an electromotive force upon relative rotation of wheels of railway equipment or the like, such as the relative rotation between such wheels as causes operation of the switches described above.

Thus in Fig. 9 I show shafts 17i and 18i. A bracket 130i is provided on the shaft 18i and carries field pieces F1 and F2, and an armature A is fast on the shaft 17i for cooperation with the field pieces F1 and F2. In Fig. 12 I have diagrammatically illustrated an armature Aj and brushes 213j and 214j. It will be apparent that upon rotation of the shafts 17i and 18i relative to each other that the field pieces F1 and F2 will rotate relative to the armature A whereupon electromotive force will be set up in the armature A. Upon similar relative movement between the armature Aj and field pieces corresponding to the field pieces F1 and F2, Fig. 9, an electromotive force will be generated in the armature Aj.

Referring first to the form of the invention shown in Fig. 9, a switch similar to that shown in Fig. 8 is employed, said switch comprising the plate 129i of insulating material on which contact strips 60i and 61i similar to the contact strips 60d and 61d, Fig. 8, are provided to be successively engaged with the spring contact 64i. Then in the manner described with reference to Fig. 8, circuit is alternately closed from the conductor 48i to the conductors 50i or 52i.

Either in the manner disclosed in Fig. 8 or in any other suitable way, the conductors 48i, 50i and 52i will be connected in circuit with devices which will bring about operation of a slow-to-release relay SR3i, the slow-to-release relay SR3i, for example, corresponding to the slow-to-release relay SR3i, Fig. 8. To further illustrate how the slow-to-release relay SR3i could be placed under control of circuits of which the conductors 48i, 50i and 52i are a part, conductors 70i and 68i are shown connected to opposite ends of the winding 67i of the slow-to-release relay SR3i. Such conductors 70i and 68i could lead respectively to terminals as 94d and 205, Fig. 8.

When circuit is closed through the winding 67i to energize the slow-to-release relay SR3i the armature 71i is attracted into engagement with the contact 73i whereupon circuit is closed from a source of current as the battery B3i through conductor 78i, terminal 206, conductor 72i, armature 71i, contact 73i, conductor 79i, terminal 207, conductor 208, winding 76i and conductor 77i back to the battery Bwi whereupon the solenoid 74i of which the winding 76i is a part is rendered operative to bring about a control operation such as, for example, that brought about upon energization of the solenoid 74d described above.

It will be recognized that energization of the slow-to-release relay SR3i is brought about by rotation of the shafts 17i and 18i relative to each other, for example, as relative rotation of the shafts 17d and 18d, Fig. 8, brings about energization of the slow-to-release relay SR3d. When such relative rotation between the shafts 17i and 18i occurs there is relative rotation between the field pieces F1 and F2 and the armature A whereupon an electromotive force is set up in the armature A. A conductor 209 leads from one end of the winding of the armature A to a conductive disc 210 mounted on, but insulated from, the shaft 17i while another conductor 211 leads from the other end of said winding to a conductive disc 212 mounted on, but insulated from, the shaft 17i. A stationary spring contact 213 bears on the disc 210 and another stationary spring contact 214 bears on the disc 212. A conductor 215 leads from the spring contact 213 to one end of the winding 216 of a relay R3 while a conductor 217 leads from the other end of the winding 216 to the spring contact 214.

Thus an electromotive force set up in the armature A is impressed on the winding 216 and when this electromotive force is of sufficient magnitude, which would be directly proportionate to the magnitude of the relative rotation between the shafts 17i and 18i, relay R3 is energized whereupon the armature 218 thereof is attracted into engagement with the contact 219 and thereupon circuit is closed from the source of current as the battery B3i through conductor 78i, terminal 206, conductor 220, armature 218, contact 219, conductor 221, terminal 207, conductor 208, winding 76i, conductor 77i, and back to the battery B3i which affords another source of energization for the solenoid 74i.

It will be apparent, so long as the relative rotation between the shafts 17i and 18i is great enough to generate an electromotive force sufficient to effect operation of the relay R3 that circuit will be closed through the winding 76i wherefore the solenoid 74i will be maintained operative for the purpose above described.

The arrangement including the relay R3 need not be, but could be, as sensitive, or even more sensitive, than that including the slow-to-release relay SR3i but preferably is not as sensitive so that once the relay R3 is rendered operative it will bring about and maintain a control operation, such as is brought about by operation of the solenoid 74i, so long as an abnormal condition, indicated by rotation of the shafts 17i and 18i relative to each other, is prevalent. Of course, when the relative rotation between the shafts 17i and 18i is so reduced that the electromotive force set up is not sufficient to maintain the relay R3 energized, the relay releases and the stick circuit for the winding 76i closed by engagement of the armature 218 with the contact 219 will be broken. Either before or after this, depending upon conditions, the slow-to-release relay SR3i will release freeing the armature 71i from the contact 73i whereupon the circuit closed by engagement of said armature with said contact is opened. If desired, a slow-to-release relay could be used in place of the relay R3.

From the foregoing it will be apparent that the arrangement shown in Fig. 9 is such that a dual source of energization for the winding 76i of the solenoid 74i is provided and hence if one or the other of the means controlling this dual source of energization should fail to operate as intended the other may be relied upon to bring about a control operation.

In Fig. 12 a modification of the arrangement shown in Fig. 9 is illustrated and herein a conductor 217j leads from the brush 213j to one end of the winding 216j of the relay R3j while a conductor 215j leads from the other end of this winding to the brush 214j.

It will be understood that the field pieces of the generator shown in Fig. 12 are arranged for rotation at a speed proportionate to the rate of rotation of a wheel of railway equipment or the like while the armature Aj is arranged for rotation at a rate proportionate to another such wheel and that when the relative rotation between these field pieces and the armature Aj is sufficient to generate an electromotive force that will cause operation of the relay R3j, the armature 218j of this relay is attracted into engagement with the contact 219j. Thereupon circuit is closed from ground at 222 through armature 218j, contact 219j, conductor 223, terminal 224 and conductor 225 and through winding 76j and conductor 77j to the source of current as the battery B3j which is grounded as indicated at 78j. The winding 76j is part of a solenoid 74j similar, for example, to the solenoid 74f. The winding 76j has another source of energization which is from ground at 72j through armature 71j when it is engaged with contact 73j and thence through conductor 79j, terminal 224, conductor 225 and circuit is thereupon closed through winding 76j, conductor 77j, battery B3j to ground at 78j.

The armature 71j is part of a slow-to-release relay SR3j; the winding 67j of which is energized from ground at 69j through a source of current as the battery B2j and conductor 68j, which is connected to one end of the winding 67j. A conductor 70j is connected to the other end of the winding 67j and may, for example, be led to a suitable point such as the contact 36a, Fig. 5, so that when a ground connection is made to the contact as 36a in the manner described hereinabove the relay SR3j will be energized.

As in the case of the arrangement shown in Fig. 9, the means for generating an electromotive force is intended to supplement the action of a switch which would cause ground to be applied on the winding 67j when an abnormal condition such as predetermined relative rotation between the wheels of railway equipment exists. The two sources of energization for the winding 76j of the solenoid 74j can be used to supplement each other but, of course, one or the other of such sources of energization could be used alone if so desired.

There may be instances where it will be desirable to render devices under control of switches as S inoperative as where on railway equipment it is desired to make an emergency stop in such circumstances that it is immaterial whether or not the wheels of the railway equipment may slide. It will be apparent from the foregoing description that devices such as those which are under control of the switches as S, or means for generating an electromotive force such as shown in Figs. 9 and 12, will be provided on each piece of railway equipment and preferably in association with each set of wheels on such equipment. Assuming, therefore, that each piece of railway equipment, diagrammatically illustrated in Fig. 14 and indicated by C, has two sets of wheels thereon, a switch as the switch S, Fig. 2, or the like will be arranged to be responsive to each set of wheels. Such switches are diagrammatically shown in Fig. 14 and are indicated by S.

In this instance means under control of the switches S or the like are shown enclosed in housings H. Combined vent and check valves under control of solenoids as 74k are provided although of course separate vent and check valves as 29 and 30, Fig. 1, could be utilized. In the present instance, I have diagrammatically illustrated in Fig. 14 solenoids 74k for combined vent and check valves, circuits to the windings 76k of which are closed through conductors 77k and 79k which, for example, could respectively lead to contacts as 73d and terminals as 205, Fig. 8.

If such an arrangement were used each time a switch S is operated in the manner hereinabove described upon predetermined relative rotation between the wheels of the set with which the switch S is associated the combined vent and check valve associated with the solenoid 74k under control of the particular switch would be operated or, of course, other control operation could be effected.

In order to place all of such a plurality of switches S under a common control, a common source of current such as the battery B7, Fig. 14 is provided. A conductor 226 extends from one terminal of this battery and conductors 42k, similar to the hereinabove described conductors 42 both with and without suffixed, are connected to this conductor 226. Likewise, conductors 48k, similar to the conductors 48 both with and without suffixes as described herein, are connected to a conductor 227. The conductor 227 leads to a terminal 228 in the main switch M which includes a blade 229 to which is connected a conductor 230 that leads to the other terminal of a source of current as the battery B7.

So long as the blade 229 of the switch M is engaged with the contact 228 circuit is closed to the conductors 48k and 42k and, in the manner above described, upon operation of the switches S, when an abnormal condition exists, circuits are closed to the solenoids 74k. When, however, it is desired to render the switches S ineffective, the blade 229 of the main switch M is disengaged from the contact 228 whereupon the conductors 48k are disconnected from the source of current. In such an instance whether or not the switches S tended to close circuit from the conductors as 48k to conductors as 50k and 52k a control operation would not be initiated since the conductors 48k are disconnected from battery. The main switch M is preferably located at a convenient point, desirably to be under control of the operator of the brakes of the railway equipment and to this end the switch would be provided in the locomotive operating the cars as C, such locomotive being diagrammatically illustrated in Fig. 14 and being indicated by D.

Thus far I have described slow-to-release relays as being used to interpose a time factor in the operation of my novel control apparatus. It is to be understood, however, that a wide variety of devices might be used in place of slow-to-release relays and, as an example of other devices embodying a time factor in their operation and which might be used in my apparatus, I have shown, in Fig. 14A, three dash pots 231, 232 and 233 as being substituted for the slow-to-release relays SR1b, SR2b, and SR3b, respectively, illustrated in Fig. 6.

Each of these dash pots as 231 includes a cylinder 234, a piston 235, a spring 236, normally urging the piston outwardly of the cylinder, and a plunger 237 which is preferably the core of a solenoid and which is connected to the piston. An arm 238 pivotally mounted as indicated at 239 exteriorly of the cylinder extends through an opening 240 in the wall of the cylinder and when the piston 235 is in its inoperative position it is forced against this arm by the spring 236 and engagement of the arm with the edge of the opening 240, therefore, limits outward movement of the piston in the cylinder.

A relatively enlarged opening 241 is provided within the piston 235 and is normally covered by a flap valve 242 which has a relative restricted orifice 243 therein communicating with the opening 241. When the winding 41m, of the solenoid of which the core 237 is a part, is energized, the core or plunger 237 is forced in the direction of the piston 235 whereupon the piston is forced inwardly of the cyliner 234. During such inward movement of the piston the flap valve 242 is forced from its normal position with respect to the opening 241 whereupon the piston may be forced inwardly of the cylinder 234 rather rapidly. However, when circuit to the winding 41m is broken the spring 236 becomes effective to force the piston 235 outwardly of the cylinder 234. During such outward movement of the piston the flap valve 242 seats over the opening 241 and in the present instance air (it will of course be understood that it could be any suitable fluid) is admitted through the relatively restricted orifice 243 and opening 241 to the area interiorly of the cylinder and below the piston rather slowly and as a result the piston 235 is slowly forced outwardly. This slow outward movement of the piston affords a time factor comparable to the release time of a slow-to-release relay.

Whenever the piston 235 moves from its normally inoperative position inwardly of the cylinder 234, a spring 244 acting on the arm 238 pivots this arm toward the pivotally mounted contact 37m, a block of insulating material 245 being interposed between the arm 238 and the movable contact 37m. Such movement of the arm 238 engages the contact 37m with the fixed contact 36m. Of course, when the piston 235 returns to its normal inoperative position, it so moves the arm 238 that the movable contact 37m is disengaged from the fixed contact 36m.

The dash pots 232 and 233 are similar to the dash pot 231, inward movement of the piston of the dash pot 232 causing engagement of the movable contact 40m with the fixed contact 39m, such inward movement of this piston resulting from energization of the winding 45m, and likewise energization of the winding 67m causes inward movement of the piston of the dash pot 233 to cause engagement of the movable contact 71m with the fixed contact 73m. Contrawise, the normal inoperative positions of these pistons disengages the contacts 40m and 71m, respectively, from the contacts 39m and 73m.

The form of my invention shown in Fig. 14A operates similarly to the form of my invention shown in Fig. 6, which is to say, through a suitable switch such as the switch S, Fig. 2, or an equivalent switch, circuit is alternately closed from battery B1m and conductor 48m to conductor 50m or conductor 52m. The conductor 50m leads to a terminal 87m while the conductor 52m leads to a terminal 88m and when circuit is closed to these conductors it is also closed to these terminals.

It will be understood that so long as the dash pots 231, 232 and 233 are operative, that is so long as the pistons of these dash pots are out of the normally inoperative position thereof illustrated in Fig. 14A, that the movable contacts 37m, 40m and 71m are respectively engaged with the fixed contacts 36m, 39m and 73m.

When circuit is closed in the manner hereinabove described to the terminal 87m, circuit is also closed through conductor 89m, winding 47m, and conductors 44m and 42m back to the source of current B1m whereupon winding 47m is energized and the piston of the dash pot 231 is forced inwardly and movable contact 37m engages fixed contact 36m. Such engagement of contacts 36m and 37m does not necessarily close circuit to the winding 67m since circuit to conductor 52m and terminal 88m is not closed at the same time that circuit is closed to conductor 50m and terminal 87m, and in normal operation circuit will have been broken to the conductor 50m and the winding 47m will have been deenergized to thereby disengage the contacts 36m and 37m prior to the time circuit is closed to conductor 52m.

When circuit is closed to conductor 52m it is also closed to terminal 88m and in normal operation, as explained above this does not close circuit through conductor 132m, movable contact 37m, fixed contact 36m and conductor 93m to terminal 94m for at this time contact 37m will be disengaged from contact 36m.

However, closing of circuit to conductor 52m also closes circuit to conductor 92m and through winding 45m and conductors 46m, 90m and 42m back to the source of current B1m whereupon the piston of dash pot 232 is forced from its normally inoperative position and movable contact 40m engages fixed contact 39m. However, since in normal operation circuit will not be closed to terminal 87m at the time contact 40m engages contact 39m, circuit is again not closed, in normal operation, to terminal 97m in this instance.

When, however, circuit is closed to conductor 52m and terminal 88m prior to the time movable contact 37m has disengaged contact 36m, which engagement was brought about by the closing of circuit to terminal 87m, then circuit is closed from terminal 88m through conductor 132m, contact 37m, contact 36m and conductor 93m to terminal 94m. At this same time the winding 45m will be energized and movable contact 40m will be engaged with fixed contact 39m. If, therefore, circuit is closed to conductor 50m and terminal 87m prior to the time contact 40m disengages contact 39m, circuit will be closed to terminal 94m from terminal 87m through conductor 95m, contact 40m, contact 39m and conductor 96m.

When circuit is closed to terminal 94m from either of the sources above described, circuit is closed through conductor 70m, winding 67m and through conductors 68m, 135m, 90m and 42m back to the source of current B1m whereupon winding 67m is energized and movable contact 71m is engaged with fixed contact 73m. The engagement of these contacts closes circuit from conductor 72m, which may be led to a terminal, similar to the terminal 133, Fig. 8, in the conductor 48m, through contacts 71m and 73m and conductor 77m to winding 76m, the circuit being completed through the conductors 79m, 135m, 90m and 42m back to the source of current B1m. Closing of circuit in this manner energizes the winding 76m and thereupon renders the solenoid 74m operative, the solenoid 74m corresponding to, for example, the solenoid 74b, Fig. 6, to bring about a control operation as above described. In such instance the dash pot 233 will operate similarly to the slow-to-release relay SR3b to bring about a control operation for at least a predetermined time, such time being dependent upon the time required for the piston of the dash pot 233 to return to its normal inoperative position which, as explained heretofore, results in separation of movable contact 71m from fixed contact 73m.

It will be seen from the foregoing description that devices other than slow-to-release relays may be employed but in any event it is important to employ a device which embodies a time factor in its operation so that whenever the force rendering the device operative is interrupted as, for example, when an energizing circuit therefor is broken, the device will remain operative for at least a predetermined period. Furthermore, devices similar to the herein described dash pots or other equivalent means, but having a time factor interposed in their operative cycle in what might be called their energizing rather than their releasing phase, as do the described dash pots, might be used in place of the slow-to-release relays described herein.

Frequently undesirable wheel slipping conditions are produced by a slippery condition of the rails, which might be caused, for example, by frost, ice, or oil on the rails, rather than by differences in braking conditions at the wheels or the like during a braking operation. Such slipping or sliding of the wheels under these circumstances can usually be remedied by sanding the rail ahead of each wheel in the direction of travel of the vehicle. A conventional sanding mechanism for this purpose is shown in Fig. 15 where it is employed on a locomotive having three pairs of driving wheels. A separate sand box 250 is provided for supplying sand to each of the wheels W1, W2 and W3. Inasmuch as the locomotive may be driven in either a forward or reverse direction, provision must be made for sanding the rail on either side of each wheel and to this end sand pipes 251 leading from the sand boxes 250 are provided for sanding the rail ahead of the wheels when the locomotive is traveling in a reverse direction, and other pipes 252 are provided for sanding the rails in proximity to the wheels when the locomotive is traveling in a forward direction. Each pipe 251 is provided with a sand trap 253 which is operated to discharge sand only during reverse travel, and the sand pipes 252 are provided with traps 254 which are operated to discharge sand only during forward travel. A reverse control valve 255 is arranged to be operated in dependence upon the fluid pressure in a control pipe 256 for admitting air under pressure from the main reservoir pipe 257 to the reverse sand traps 253. A forward control valve 258 is operable in dependence upon the fluid pressure in a control pipe 259 for admitting compressed air from the main reservoir pipe 257 to the forward sand traps 254. The means for regulating the fluid pressure in the control pipes 256 and 259 will be described presently.

To compare the rotative speeds of the wheels, a switch Sn is employed which is identical in construction to the switch S shown in Figs. 1 to 4 and the rotating parts of the switch Sn are connected in a similar manner by flexible shafts 23n and 26n respectively to the gears 24n and 27n which mesh with the gears 25n and 28n on the axles of the wheels W1 and W2, respectively. The switch Sn operates to compare the rates of rotation of the wheels W1 and W2 for thereby detecting any tendency toward a wheel sliding condition which may arise, and it will be understood that a similar detecting switch could be provided for comparing the rates of rotation of the wheels W2 and W3. A conductor 48n is in electrical contact with the rotating element of the switch Sn that corresponds to the brush 64 of the rotor 16 of the switch S, Fig. 2, and this conductor 48n is in the present instance grounded to some convenient point on the frame of the locomotive. Conductors 50n and 52n are respectively in electrical contact with contact strips corresponding to the strips 60 and 61 of the rotor 15, Fig. 2.

Referring to Fig. 16, the conductors 50n and 52n are respectively connected to the windings 47n and 45n of the slow-to-release relays SR1n and SR2n which respectively correspond to the relays SR1 and SR2 shown in Fig. 1, or to the relays SR1a and SR2a shown in Fig. 5. Under normal conditions, the slow-to-release relays SR1n and SR2n are not energized concurrently, but when there is a predetermined difference in rotative speeds of wheels W1 and W2, the relays SR1n and SR2n are alternately energized and the contacts 37n and 40n of these relays are maintained closed concurrently so that a circuit is completed from ground through the contacts 40n and 39n of relay SR2n, conductor 66n, contacts 37n and 38n of relay SR1n, and conductor 70n to one side of the winding 67n of a slow-to-release relay SR3n which corresponds to the relay SR3 in Fig. 5, the other side of the winding 67n being connected to battery. Relay SR3n thereupon energizes and closes its contacts 71n and 73n to thereby ground the conductor 73n which leads to a brake release valve solenoid such as 76, Fig. 5. So long as the discrepancy in the rates of rotation of the wheels 51 and 52, Fig. 15, is sufficiently great so that the slow-to-release relay SR1n maintains its contacts closed for at least a portion of the time when the contacts of relay SR2n are closed, the relay SR3n is effective to cause release of the brakes.

However, as has been explained hereinabove, it is not always necessary to release the brakes in order to cure a condition tending toward wheel slipping, for it is possible that this may be accomplished by merely sanding the rails to thereby increase the coefficient of adhesion between the wheels and the rails. To this end, means have been utilized for enabling the sanding apparatus shown in Fig. 15 to come into operation prior to the brake pressure control means, and if the sanding of the rails eliminates the undesirable condition, the brakes will not be released. To this end, the fluid pressure in the sander control pipes 259 and 256, Figs. 15 and 16, is automatically regulated by solenoid valves 260 and 261, Fig. 16, respectively, which are under the control of electrically operated means responsive to the switch Sn, Fig. 15. To accomplish the foregoing, a slow-to-release relay SR5 is provided and one side of the winding 262 of this relay is connected by a conductor 263 to a terminal 264 which is included in the conductor 50n that is in electrical contact with one of the rotating contact strips of the switch Sn. The other side of the winding 262 is connected to battery so that the slow-to-release relays SR1 and SR5 are therefore connected in parallel with each other to be simultaneously energized whenever ground is applied to the conductor 50n in the course of operation of the switch Sn. The relay SR5 has cooperating contacts 265 and 266 which, when the relay SR5 is energized, are closed to complete a circuit from a terminal 267 included in the conductor 66n, through a conductor 268 and the contacts 265 and 266 to the conductor 269 which is connected to one side of the winding 270 of slow-to-release relay SR6, the other side of this winding being connected to battery. Thus relay SR6 will be maintained energized so long as the contacts 265 nad 266 of relay SR5 are maintained closed for at least a portion of the time when the contacts 39n and 40n of the relay SR2n are closed.

As has been explained hereinabove in connection with the circuits in Figs. 1 and 5, the relays SR1n and SR2n have definite release times such that if the difference in the rates of rotation of the wheels W1 and W2, Fig. 15, is so small that the time interval elapsing between alternate energizations of the relays SR1n and SR2n is greater than the release time of these relays, then the contacts of these relays will not be closed concurrently and thereby the slow-to-release relay SR3n is not energized, so that a brake releasing operation cannot be effected. The release times of the relays SR1n and SR2n are so selected as to accommodate a maximum difference in rotative speeds of the wheels such as might be caused by a difference in wheel diameters and not due to any wheel slippage. Hence there must be a definite condition tending toward wheel sliding before the relay SR3n is operated to release the brakes. By providing an automatic sanding apparatus, it is feasible to so shorten the release times of the relays SR1n and SR2n that the brake releasing means will not be operated unless there is greater than a predetermined difference in rotative speeds of the wheels W1 and W2, the sander control means being relied upon to correct any difference in wheel speeds which is less than such predetermined amount but greater than any difference in speeds which might be due to a discrepancy in wheel diameters.

The relay SR5 has a longer release time than the relay SR1n because, for the reasons given hereinabove, it is desired that the sanding apparatus be more sensitive to a tendency toward wheel slippage than is the brake release means. For example, the release time of relays SR1n and SR2n may be so adjusted that their contacts will be simultaneously closed when there is a difference of forty revolutions per minute or greater in the rotative speeds of wheels W1 and W2. If the release time of relay SR5 is now adjusted to be approximately twice as great as the release time of SR1n, then the relay SR5 will maintain its contact closed during a portion of the time that the relay SR2n maintains its contact closed whenever the difference in rotative speeds of the wheels W1 and W2 is approximately twenty revolutions per minute or greater. Hence the slow-to-release relay SR6 will always be energized under the control of the relays SR2n and SR5 prior to any energization of the relay SR3n, the difference in sensitivity being about twenty revolutions per minute of the total difference in wheel speeds.

When relay SR6 is energized, it engages its contact 271 with its contact 272 to thereby apply ground on the conductor 273 which leads to a contact 274 of a reversing relay R7. The relay R7 is normally deenergized when the locomotive or vehicle is traveling in a forward direction, and under these conditions the contact 274 is maintained in engagement with a contact 275, wherefore the circuit is completed from the conductor 273 through contacts 274 and 275 to a conductor 290 which leads to the winding of the solenoid valve 260, the other side of this winding being connected by a conductor 291 to battery. Thus if relay R7 is deenergized when the slow-to-release relay SR6 is energized, the valve 260 is actuated and fluid under pressure is admitted from a reservoir pipe 257' through pipes 278 and 292 past the valve 260 to the control pipe 259, Figs. 15 and 16, to operate the forward control valve 258 and thereby enable sand to be discharged from the forward sand traps 254 and pipes 252 to the rail in front of the wheels W1, W2 and W3. If such application of sand to the rail stops the tendency of the wheels to slide, the rotating elements of the switch Sn are brought back into substantial synchronism and the relays SR2n and SR5 are no longer alternately energized within the release time of the relay SR5. Relay SR6 therefore deenergizes and opens its contacts after a predetermined time to thereby deenergize the solenoid valve 260 and normalize the forward control valve 258, so that further application of sand to the rail is prevented.

If the sanding of the rails does not eliminate the tendency toward wheel sliding, and the difference in angular velocity of the wheels W1 and W2 continues to increase so that the relays SR1n and SR2n are alternately energized within the release times of these relays, then the slow-to-release relay SR3n is operated to release the brakes from the wheels to thereby establish normal rolling, the sanding means continuing in operation in such an instance.

When the locomotive is traveling forwardly, the reverse control valve 255 should remain in its inoperative condition, and likewise, if the direction of travel is in the reverse direction, the control valve 255 should be rendered operable and the forward control valve 258 should be disabled. To this end, a reversing switch generally designated RS, Fig. 16, is provided for energizing or deenergizing the relay R7 in accordance with the direction of travel. The switch RS includes a ball bearing device generally designated 280 which may be mounted upon an axle such as that to which the gear 28n is fast or to some shaft that rotates in the same direction as the axle. Due to the slight friction of the ball bearings, the device 280 tends to rotate in the same direction as the axle, but it is limited in such rotative movement by oppositely disposed stops 281 and 282 which cooperate with a lug 283 on the periphery of the device 280. A mercury switch 284 is attached to the ball bearing 280, and when the axle is rotated in the forward direction as indicated in Fig. 16, the switch 284 is open, but when the direction of rotation of the axle is in the opposite or reverse direction, the switch 284 closes the circuit between its contacts 285 and 286. This extends circuit from ground through these contacts to the conductor 287 which leads to one terminal of the winding 288 of the relay R7. Relay R7 is thus energized and actuates its contact 274 to break circuit to the contact 275 and establish circuit to the contact 289.

Assuming that the relay SR6 is operated due to a difference of greater than twenty revolutions per minute in the velocity of wheels W1 and W2, and at a time when the relay R7 is energized, which is to say, when the locomotive is traveling in a reverse direction, circuit is extended from ground through the contacts 271 and 272 of relay SR6, through conductor 273, contacts 274 and 289 of the relay R7 and conductor 276 to one terminal of the solenoid valve 261, the other terminal of this solenoid being connected by a conductor 277 to battery. This results in the energization of the solenoid valve 261, and fluid under pressure is admitted from the main reservoir pipe 257' to pipes 278 and 279 past the valve 261 to the control pipe 256, Figs. 15 and 16, for operating the reverse control valve 255 to thereby discharge sand from the reverse sand traps 253 and pipes 251 to the rail in the direction of movement of the wheels.

Thus it can be seen from the foregoing that whenever there is at least a predetermined difference in rotative speeds of wheels W1 and W2, of say, twenty revolutions per minute, the automatic sanding apparatus is operated to sand the rails in the direction of movement of the wheels. For either forward or reverse travel of the locomotive the sanding apparatus comes into operation prior to the brake releasing means upon the occurrence of a tendency toward wheel sliding, and if this does not remedy the undesirable condition, the continued increasing difference in speeds of the wheels causes the brake releasing means to become operative, whereby the normal rolling of the wheels is restored. However, if the sanding of the rails eliminates the tendency toward wheel sliding, then there is no need to release the brakes and the brake releasing means therefore remains inoperative.

It is manifest that the sander control means shown in Figs. 15 and 16 will afford equally satisfactory operation of the sanding apparatus during starting or speeding up of the locomotive, to thereby prevent the occurrence of a predetermined variation in wheel speeds such as would be indicative of a tendency toward skidding of the driving wheels W1, W2 and W3. It is possible, of course, that the brake release control relay SR3n, Fig. 16, may also be operated during acceleration of the driving wheels, but this is without effect inasmuch as the brakes are not applied while starting or speeding up the locomotive. If desired an independent sanding control apparatus similar to that shown in Fig. 16 could be provided for use only when the locomotive or other vehicle is not being braked, and by employing a pressure-responsive switch such as 80, Fig. 5, one or the other of the sander circuits can be rendered operative depending whether or not a braking operation is being effected. This is of utility, for instance, on a locomotive or like vehicle having both driving and driven wheels, in which case the arrangement can be such that only the driving wheels are sanded if a tendency toward wheel sliding is exhibited during starting or other acceleration, whereas all the wheels will be sanded if the same condition arises in the course of a braking operation.

While the reversing switch RS shown in Fig. 16 affords a very reliable means of insuring that the automatic sanding apparatus is properly conditioned for either forward or reverse operation of the locomotive, it may be found more convenient, particularly in the case of electric locomotives, to employ a switch means which is in the nature of an attachment to the reversing switch of the master controller, such as shown in Fig. 17, in lieu of the switch RS.

By referring to Fig. 17, it will be seen that the reversing switch lever 294 has a handle 295 and is mounted on a spindle 296, and this handle is provided with a spring pressed dog 297 which is adapted to seat at any one of three notches 298, 299 or 300, provided in an arcuate retaining plate 301. A contact 274p is attached to the end of the lever 294 opposite the handle 295, and this contact 274p is adapted to cooperate with either of two staionary spaced contacts 275p and 289p, these parts respectively corresponding to the like-numbered contacts of the relay R7 in Fig. 16. When the lever 294 is in neutral position as shown in Fig. 17, the movable contact 274p does not engage either of the stationary contacts 275p or 289p, but when the lever 294 is moved into its "forward" position in which the dog 297 is seated in the notch 300, circuit is closed from the conductor 273p through the contact 274p and the contact 275p, with which it is in engagement, to the conductor 290p, thus conditioning for operation the "forward" solenoid valve such as 260 in Fig. 16. Likewise, if the lever is adjusted to a position in which the dog 297 is seated in the notch 298, circuit is closed from the conductor 273p and contact 274p to the contact 289p and conductor 276p, thus conditioning the "reverse" solenoid valve 261, Fig. 16, for operation.

A shut-off valve 302 is provided in the pipe 278 which leads from the main reservoir pipe 257', and when it is desired to disable the automatic sanding control apparatus, the valve 302 is closed and a valve 303 in another branch pipe 304 is opened. This renders operative a manual sanding control valve generally designated 305 for operating the sanding apparatus independently of the automatic control circuit.

In Fig. 18 there is shown a modification of the invention in which a condition tending toward wheel sliding may be detected without the need of comparing the rates of rotation of two wheels of which both are being braked. A detecting switch Sr similar to the switch S in Figs. 1 to 4 is employed and one of the rotating elements of this switch is connected by a flexible shaft 23r to a gear 302 which meshes with a gear 303 that is fast on the axle of the wheel W that is to be braked. A small trailer unit, generally designated 304, is supported by suitable means from the frame of the vehicle and includes a small wheel 305 which is rotatably mounted in the unit 304 and which is maintained in contact with the rail. A gear 306 is connected to the wheel 305 for rotation therewith as the wheel 305 travels along the rail, and a gear 307 is mounted in position to mesh with the gear 306, the other rotating element of the switch Sr being connected by a flexible shaft 26r to the gear 307. The ratio of the gears 306 and 307 is such that the shaft 26r will be rotated at the same rate as the shaft 23r when there is a normal rolling condition of the wheel W. If, however, the wheel W tends to slide during a braking operation, the rotative speed of the shaft 23r will decrease relative to the speed of the shaft 26r, inasmuch as the wheel 305 is not braked. The switch Sr and control apparatus associated therewith then operate in the above described manner to relieve the braking force on the wheel W, or sand the rail ahead of this wheel, as the case may be.

It will be understood from the foregoing description that the switch shown in Fig. 2 could be substituted for the switches shown in Figs. 8, 9, 10, 11 and 13A or that any one of the switches shown in these last-named views could be substituted for each other or the switch shown in Fig. 2. Furthermore, an arrangement such as the clutches 82 and 83, Fig. 5, could be associated with any of the illustrated switches so that the relatively movable parts of the switches would not be driven except at a time when the need for a control operation might arise, such as, for example, during a braking operation on railway equipment when wheel slippage might occur.

It will be recognized that the arrangements shown in Figs. 11 and 13 avoid relative rotation between switch parts through which an electric circuit is closed, and that the arrangement shown in Fig. 10 insures positive engagement of the brush with the contact strips. Furthermore, the switches such as are shown in Figs. 11 and 13 could be arranged to cause contact closure through one hundred eighty degrees of relative rotation rather than through ninety degrees of relative rotation as is effected in switches such as shown in Fig. 2.

It is also to be understood that a switch such as the switch 80, Fig. 5, could be provided in the various arrangements illustrated so as to prevent energization of the relays or the like in the various circuits except during those times when the need for a control operation might arise, the disposition of the switch 80 as shown in Fig. 5 being typical of such an arrangement.

It will be apparent that the provision of a slowto-release relay such as the slow-to-release relay SR3, Fig. 5, will cause a control operation to be effected for at least a predetermined period and that this arrangement avoids a fluttering condition such as might arise in the use of an arrangement such as shown in Fig. 1 as hereinabove explained.

It is also to be understood that visible signals, such as the lamp L, Fig. 7, or audible signals, such as the buzzer N, Fig. 7, could be associated with each of the various arrangements illustrated to indicate that a control operation is in progress. It will be recognized that either or both of such signals could be employed and that such signals could be located near the main switch M, Fig. 14, if so desired.

It will likewise be apparent that the provision of a slow-to-energize relay as SE1, Fig. 7, affords a safety factor for, if a control operation should not be effected in the manner intended, such a relay could be arranged, as is the relay SE1, to prevent a further control operation being effected until the devices effectuating the control operation had been manually rendered operative as by separating a movable contact as 109 from a fixed contact as 108.

It is also to be understood that while I have, in most instances, shown and described two slow-to-release relays for controlling operation of the means which bring about a control operation, comparable results could be obtained by employing but one slow-to-release relay. For example, either the relay SR1 or the relay SR2, Fig. 1, could be a slow-to-release relay while some other suitable relay, not slow-to-release, could be substituted for the other. In such an instance circuit would be closed to the coils 31 and 33 only when such other relay was rendered operative at a time the slow-to-release relay remained operative. This would also be true if only the relay SR1a or the relay SR2a, Fig. 5, were a slow-to-release relay, in which instance relay SR3 would be rendered operative under the circumstances described above and circuit would be closed to windings 31 and 33 as described hereinabove. The foregoing explanation illustrates how only one slow-to-release relay could be used in the various arrangements shown and described herein, it being remembered that only one such relay need be utilized in the arrangement shown in Fig. 13.

It will also be understood that by providing additional rotors, such as the rotors 15 and 16, or the like, in the switch S or other of the switches, or equivalent means, and by duplicating devices described herein, or providing equivalents thereof, in association with such additional rotors or the like that my novel apparatus could be rendered responsive to predetermined relative movement among more than two relatively movable elements, and hence it will be recognized that while I have described my device as being responsive to predetermined relative movement between two movable elements (especially two associated wheels of railway equipment) that it is capable of much wider application.

My invention has been described with particular reference to preventing wheel sliding in event of slippage of a wheel of railway equipment on the rail on which it normally rolls. However, it is to be understood that my invention is susceptible of use to bring about a control operation wherever parts capable of movement relative to each other are provided.

Furthermore, in describing my invention I have referred to releasing the braking means effective to decelerate wheels with which my apparatus is used and I have also referred to reducing the effectiveness of such braking means in the sense that the braking means are not entirely released but it will be appreciated that the effect is the same in either instance for if the braking means are released they are, by that fact, reduced in effectiveness, which is to say, reduced in retarding effect.

An additional advantage of my invention is that it is not confined to means for automatically affecting the braking pressure when a tendency toward wheel sliding occurs, but it also enables additional control operations, such as sanding of the rails, to be effected to remedy the undesirable condition. This modification of the invention is shown in Figs. 15 and 16 and it will be seen by reference thereto and to the description thereof, that I have afforded an apparatus embodying a brake control and sanding control having different degrees of sensitivity whereby the automatic sander is operated when there is a relatively small difference in wheel speeds, say, twenty revolutions per minute or greater, and the braking means is brought into operation only if this difference continues to increase to, say, forty revolutions per minute or greater. Thus, if the variation in relative rotative speeds of the wheels is due merely to a slippery condition of the rails and not because of any difference in braking conditions at the several wheels, the sanding apparatus operates to remedy the condition, by increasing the coefficient of adhesion between the wheels and the rail, and braking pressure is not relieved by the brake control means unless the tendency toward wheel sliding cannot be alleviated by sanding the rails. Moreover, as explained hereinabove, my novel sanding control apparatus is applicable to prevent a tendency toward wheel sliding during acceleration as on starting, as well as during deceleration as in a braking operation.

The arrangement shown in Fig. 18 is advantageous where it is not desired to make a comparison between the rotative speeds of two wheels that are to be braked. An instance of such an application of the invention would be where the braking system is of the type in which the braking force applied on one wheel is always greater than the braking force on another wheel. In this event, it is only the more heavily braked wheel which is likely to slide and hence a trailer unit such as 304 in Fig. 18 may be advantageously utilized to enable the switch Sr to detect a variation from normal rolling of such wheel.

I have herein illustrated a variety of embodiments of my invention and it will be noted that the feature common to the various arrangements is the utilization of at least one slow-to-release relay or equivalent device embodying a time factor in its operation. It is, therefore, to be understood that the disclosure herein of various embodiments of my invention is by no means exhaustive for the primary features underlying my invention are susceptible of use in many other arrangements.

Hence while I have illustrated and described selected embodiments of my invention it is to be understood that these are capable of variation and modification and I, therefore, do not wish to be limited to the precise details set forth but desire to avail myself of such changes and alterations as fall within the scope of the following claims:

I claim:

1. In an apparatus for detecting the need for a control operation with respect to wheels or the like on railway equipment that decelerate in the course of a braking operation of such equipment whereby a desired speed relation may be maintained between the wheels or the like in the course of a braking operation, the combination of a plurality of independently operable devices each having a part adapted for cooperation with a corresponding part on at least one other of the devices to indicate the need for a control operation when such parts are rendered operative simultaneously, and a plurality of members adapted to be separately driven one by each of said wheels or the like in such a ratio that said members operate substantially in synchronism when such a desired speed relation exists between the wheels or the like, said members being operatively associated with said devices to render said devices operative successively when said members are operating in such substantial synchronism and to render at least two of said devices operative simultaneously when said members are not operating in such substantial synchronism whereby the parts of said last-named devices cooperate to indicate the need for a control operation.

2. In an apparatus as claimed in claim 1, wherein at least one of the independently operable devices is constituted and arranged to remain operative after the members have ceased to be effective thereon to render it operative.

3. In an apparatus for detecting the need for a control operation with respect to wheels or the like on railway equipment that decelerate in the course of a braking operation of such equipment whereby a desired speed relation may be maintained between the wheels or the like in the course of a braking operation, the combination of a plurality of electrically-operated devices each having a part adapted for cooperation with a corresponding part on at least one of the other devices to indicate the need for a control operation when such parts are rendered operative simultaneously, and a plurality of members affording a switch means and adapted to be separately driven one by each of said wheels or the like in such ratio that said members operate substantially in synchronism when a desired speed relation exists between the wheels or the like, the switch means afforded by said members being operatively associated with said electrically-operated devices to render said devices operative successively when said members are operating in such substantial synchronism and to render at least two of said devices operative simultaneously when said members are not operating in such substantial synchronism whereby the parts of said last-named devices cooperate to indicate the need for a control operation.

4. In a device as claimed in claim 3, wherein at least one of the electrically-operated devices is constituted and arranged to remain operative after the switch means has ceased to be effective thereon to render it operative.

5. In an apparatus for detecting the need for a control operation with respect to wheels or the like on railway equipment that decelerate in the course of a braking operation of such equipment whereby a desired speed relation may be maintained between the wheels or the like in the course of a braking operation, the combination of a plurality of relays including contacts operative to indicate the need for a control operation, and switch means operable with the wheels or the like and operative to control circuit to said relays to thereby so operate said relays that the contacts thereof are rendered operative successively, said switch means also being operable when there is more than a predetermined deviation from the speed relation desired between the wheels or the like to so control circuit to the relay that the contacts of at least two of said relays are rendered effective simultaneously to thereby indicate the need for a control operation.

6. In an apparatus for detecting the need for a control operation with respect to wheels or the like on railway equipment that decelerate in the course of a braking operation of such equipment whereby a desired speed relation may be maintained between the wheels or the like in the course of a braking operation, the combination of a plurality of relays each including contacts closable upon energization of the relay, and switch means operable with the wheels or the like and operative to close circuit to the relays successively to thereby effect energization of the relays successively, said switch means also being operative when there is more than a predetermined deviation from the speed relation desired between the wheels or the like to so close circuit to the relays that the contacts of at least two relays are closed simultaneously, the contacts so closed simultaneously being operative to control an electrical circuit and thereby indicate the need for a control operation.

7. In an apparatus for detecting the need for a control operation with respect to wheels or the like on railway equipment that decelerate in the course of a braking operation of such equipment whereby a desired speed relation may be maintained between the wheels or the like in the course of a braking operation, the combination of a plurality of relays each including contacts closable upon energization of the relay, and switch means operable with the wheels or the like and operative to close circuit to the relays successively to thereby effect energization of the relays successively, at least one of said relays being a slow-to-release relay whereby the contacts thereof remain closed after the switch means has ceased to be effective to close circuit whereby when there is more than a predetermined deviation from the speed relation desired between the wheels or the like said switch means may operate to effect energization of another of said relays to close the contacts thereof while the contacts of a slow-to-release relay are still closed whereby the contacts of at least two relays are closed simultaneously, the contacts so closed simultaneously being operative to control an electrical circuit and thereby indicate the need for a control operation.

8. In an apparatus for detecting the need for a control operation with respect to wheels or the like on railway equipment that decelerate in the course of a braking operation of such equipment whereby a desired speed relation may be maintained between the wheels or the like in the course of a braking operation, the combination of a pair of relays including contacts operable when the relays are operative simultaneously to control an electrical circuit and thereby indicate the need for a control operation when the contacts operate to effect control of said electrical circuit, and switch means operable with the wheels or the like to alternately render said relays operative and also operative when there is more than a predetermined deviation from the speed relation desired between said wheels or the like to render said relays operative simultaneously.

9. In an apparatus as claimed in claim 8, a third relay including contacts operable with the contacts of at least one relay of the pair of relays to control another electrical circuit and thereby indicate the need for a further control operation when such contacts operate to effect control of such electrical circuit, said switch means being operative to render said third relay operative in alternation with whatever relay includes contacts operable with the contacts of the third relay as aforesaid and said switch also being operative to render such relays operative simultaneously when there is more than a predetermined deviation from the speed relation desired between the wheels or the like and in which such predetermined deviation from the desired speed relation is less than the predetermined deviation specified in claim 8.

10. In an apparatus for detecting the need for a control operation with respect to wheels or the like on railway equipment that decelerate in the course of a braking opeartion of such equipment whereby a desired speed relation may be maintained between the wheels or the like in the course of a braking operation, the combination of a pair of relays including contacts engageable to close an electrical circuit and thereby indicate the need for a control operation when the relays are operative simultaneously, at least one relay of such pair being a slow-to-release relay whereby the contacts thereof remain closed after the energizing circuit to such relay is broken, and switch means operable with the wheels or the like and operative to close and open the energizing circuits to said relays alternately, said switch means also being operative when there is more than a perdetermined deviation from the speed relation desired between the wheels or the like to close the energizing circuit to the other relay of the pair when a slow-to-release relay of the pair is still operative to thereby render the relays operative simultaneously.

11. In an apparatus as claimed in claim 10, a third relay which is also a slow-to-release relay and which includes contacts operable with the contacts of a slow-to-release relay of the pair of relays to control another electrical circuit and thereby indicate the need for a further control operation when such contacts operate to effect control of such electrical circuit, said switch means being operative to render said third relay operative in alternation with whatever relay includes contacts operable with the contacts of the third relay as aforesaid and said switch means also being operative to render such relays operative simultaneously when there is more than a predetermined deviation from the speed relation desired between the wheels or the like and in which such predetermined deviation from the desired speed relation is less than the predetermined deviation specified in claim 10.

12. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of independently operable devices each having a part adapted for cooperation with a corresponding part on at least one other of the devices to render effective the means for reducing the retarding effect of the braking means, and means operable with the wheels or the like and operative to render the independent devices operative successively and also operative to cause at least two of said independent devices to be operative simultaneously when there is more than a predetermined deviation from the speed relation desired between the wheels or the like, the parts of the devices so rendered operative being constituted and arranged to render the means for reducing the retarding effect operative.

13. In an apparatus as claimed in claim 12 wherein at least one of the independently operable devices cooperates with other of the devices to render effective means which in turn render sanding means or the like effective, the means operable with the wheels being operative to render the aforesaid cooperating devices operative when there is more than a predetermined deviation from a speed relation desired between the wheels or the like that is less than the predetermined deviation specified in claim 12.

14. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of independently operable devices each having a part adapted for cooperation with a corresponding part on at least one other of the devices to render effective the means for reducing the retarding effect of the braking means, and means operable with the wheels or the like and operative to render the independent devices operative successively, at least one of the independently operable devices being constituted and arranged to remain operative after the means for rendering the devices operative has ceased to be effective thereon whereby when there is more than a predetermined deviation from the speed relation desired such device will still be operative when another of the devices is rendered operative so that at least two of such devices are operative simultaneously, the parts of the devices so rendered operative being constituted and arranged to render the means for reducing the retarding effect operative.

15. In an apparatus as claimed in claim 14 wherein still another of the independently operable devices is constituted and arranged to remain operative after the means for rendering the devices operative has ceased to be effective thereon and which cooperates with another of the independently operable devices to render effective means which in turn render sanding means or the like effective, the means operable with the wheels being operative to render the aforesaid cooperating devices operative when there is more than a predetermined deviation from a speed relation desired between the wheels or the like that is less than the predetermined deviation specified in claim 14.

16. In an apparatus as claimed in claim 14 wherein still another of the independently operable devices is constituted and arranged to remain operative after the means for rendering the devices operative has ceased to be effective thereon and which cooperates with another similarly constituted and arranged device to render effective means which in turn render sanding means or the like effective, the means operable with the wheels being operative to render the aforesaid cooperating devices operative when there is more than a predetermined deviation from a speed relation desired between the wheels or the like that is less than the predetermined deviation specified in claim 14.

17. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of electrically-operated devices each having a part adapted for cooperation with a corresponding part on at least one other of the devices to render effective the means for reducing the retarding effect, and switch means operable with the wheels or the like and operative to successively control circuit to said electrically-operated devices to thereby render said devices operative successively and also operative to cause at least two of said independent devices to be operative simultaneously when there is more than a predetermined deviation from the speed relation desired between the wheels or the like, the parts of the devices so rendered operative being constituted and arranged to render the means for reducing the retarding effect operative.

18. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of electrically-operated devices each having a part adapted for cooperation with a corresponding part on at least one other of the devices to render effective the means for reducing the retarding effect, and switch means operable with the wheels or the like and operative to successively control circuit to said electrically-operated devices to thereby render said devices operative successively, at least one of said electrically-operated devices being constituted and arranged to remain operative after the switch means has ceased to control circuit thereto whereby when there is more than a predetermined deviation from the speed relation desired such device will still be operative when the switch means is effective to control circuit to another of the devices so that at least two of such devices are operative simultaneously, the parts of the devices so rendered operative being constituted and arranged to render the means for reducing the retarding effect operative.

19. In an apparatus as claimed in claim 18 wherein at least one of the electrically-operated devices cooperates with other of the devices to render sanding means or the like effective, the switch means being operative to render the aforesaid cooperating devices operative when there is more than a predetermined deviation from a speed relation desired between the wheels or the like that is less than the predetermined deviation specified in claim 18.

20. In an apparatus as claimed in claim 18 wherein at least one of the electrically-operated devices is also constituted and arranged to remain operative after the switch means has ceased to be effective thereon and which device cooperates with another similarly constituted and arranged device to render the sanding means or the like effective, the switch means being operative to render the aforesaid cooperating devices operative when there is more than a predetermined deviation from a speed relation desired between the wheels or the like that is less than the predetermined deviation specified in claim 18.

21. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of relays including contacts operative to render effective means for reducing the retarding effect, and switch means operable with the wheels or the like and operative to control circuit to said relays to thereby so operate said relays that the contacts thereof are rendered operative successively, said switch means also being operable when there is more than a predetermined deviation from the speed relation desired between the wheels or the like to so control circuit to the relays that the contacts of at least two of said relays are rendered effective simultaneously to thereby render the means for reducing the retarding effect operative.

22. In an apparatus as claimed in claim 21 wherein at least one of the relays includes contacts that cooperate with contacts on another of the relays to render effective sanding means or the like, the switch means being operative to render the relays including the aforesaid cooperating contacts operative when there is more than a predetermined deviation from a speed relation desired between the wheels or the like that is less than the predetermined deviation specified in claim 21.

23. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of relays each including contacts closable upon energization of the relay, and switch means operable with the wheels or the like and operative to close circuit to the relays successively to thereby effect energization of the relays successively, said switch means also being operative when there is more than a predetermined deviation from the speed relation desired between the wheels or the like to so close circuit to the relays that the contacts of at least two relays are closed simultaneously, the contacts so closed simultaneously being operative to control an electrical circuit and thereby render effective the means for reducing the retarding effect.

24. In an apparatus as claimed in claim 23 wherein at least one of the relays includes contacts that cooperate with contacts on another of the relays to render effective sanding means or the like, the switch means being operative to render the relays including the aforesaid cooperating contacts operative when there is more than a predetermined deviation from a speed relation desired between the wheels or the like that is less than the predetermined deviation specified in claim 23.

25. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a plurality of relays each including contacts closable upon energization of the relay, and switch means operable with the wheels or the like and operative to close circuit to the relays successively to thereby effect energization of the relays successively, at least one of said relays being a slow-to-release relay whereby the contacts thereof remain closed after the switch means has ceased to be effective to close circuit whereby when there is more than a predetermined deviation from the speed relation desired between the wheels or the like said switch means may operate to effect energization of another of said relays to close the contacts thereof while the contacts of a slow-to-release relay are still closed whereby the contacts of at least two relays are closed simultaneously, the contacts so closed simultaneously being operative to control an electrical circuit and thereby render effective the means for reducing the retarding effect.

26. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a pair of relays including contacts operable when the relays are operative simultaneously to control an electrical circuit and thereby render effective the means for reducing the retarding effect when the contacts operate to effect control of said electrical circuit, and switch means operable with the wheels or the like to alternately render said relays operative and also operative when there is more than a predetermined deviation from the speed relation desired between said wheels or the like to render said relays operative simultaneously.

27. In an apparatus as claimed in claim 26, a third relay including contacts operable with the contacts of at least one relay of the pair of relays to control another electrical circuit and thereby render operative a sanding means or the like when such contacts operate to effect control of such electrical circuit, said switch means being operative to render said third relay operative in alternation with whatever relay includes contacts operable with the contacts of the third relay as aforesaid and said switch means also being operative to render such relays operative simultaneously when there is more than a predetermined deviation from the speed relation desired between the wheels or the like and in which such predetermined deviation from the desired speed relation is less than the predetermined deviation specified in claim 26.

28. In an apparatus for rendering effective means operative to reduce the retarding effect of the braking means on railway equipment or the like when there is more than a predetermined deviation from an ascertained speed relation desired between wheels or the like in the course of a braking operation in which such braking means is effective on at least part of the apparatus between which such ascertained speed relation is desired, the combination of a pair of relays including contacts engaged to close an electrical circuit and thereby render effective the means for reducing the retarding effect when the relays are operative simultaneously, at least one relay of such pair being a slow-to-release relay whereby the contacts thereof remain closed after the energizing circuit to such relay is broken, and switch means operable with the wheels or the like and operative to close and open the energizing circuits to said relays alternately, said switch means also being operative when there is more than a predetermined deviation from the speed relation desired between the wheels or the like to close the energizing circuit to the other relay of the pair when a slow-to-release relay of the pair is still operative to thereby render the relays operative simultaneously.

29. In an apparatus as claimed in claim 28, a third relay which is also a slow-to-release relay and which includes contacts operable with the contacts of a slow-to-release relay of the pair of relays to control another electrical circuit and thereby render operative a sanding means or the like when such contacts operate to effect control of such electrical circuit, said switch means being operative to render said third relay operative in alternation with whatever relay includes contacts operable with the contacts of the third relay as aforesaid and said switch means also being operative to render such relays operative simultaneously when there is more than a predetermined deviation from the speed relation desired between the wheels or the like and in which such predetermined deviation from the desired speed relation is less than the predetermined deviation specified in claim 28.

30. In an apparatus which includes means for reducing the retarding effect of the braking means of railway equipment or the like under control of relative movement of at least two wheels on such equipment at least one of which is decelerated by such braking means, at least two devices each having a part adapted for cooperation with a corresponding part on at least one other of the devices for rendering the reducing means operative when such parts are rendered operative simultaneously, and a plurality of members adapted to be separately driven one by each of said wheels in such a ratio that said members operate substantially in synchronism when a desired speed relation exists between the wheels, said members being operatively associated with said devices to render said devices operative successively when said members are operating in such substantial synchronism and to render at least two of said devices operative simultaneously when said members are not operating in such substantial synchronism whereby the parts of said last-named devices cooperate to render the reducing means effective, at least one of said devices being constituted and arranged to remain operative after said members have ceased to be effective thereon to render it operative whereby this and another of said devices operate simultaneously to effect operation of said reducing means when the relative movement between said wheels and therefore said members is such that said members render at least one of the devices operative at a time when a device which remains operative after the members have ceased to be effective thereon is still operative.

31. In an apparatus as claimed in claim 30, means for maintaining the reducing means operative for at least a predetermined period of time once such means has been rendered operative.

32. In an apparatus which includes means for reducing the retarding effect of the braking means of railway equipment or the like under control of relative movement of at least two wheels on such equipment decelerated by such braking means, detecting means including at least two parts respectively movable at speeds proportionate to the speeds of the respective wheels, at least two devices each having a part adapted for cooperation with a corresponding part on at least one other of the devices for rendering the reducing means operative when the devices are operative simultaneously, and means through which the detecting means are effective to render said devices operative successively upon relative movement between said wheels and the parts respectively movable with the wheels, at least one of said devices remaining operative for a predetermined period of time after the detecting means has ceased to be effective thereon to render it operative whereby the devices are operative simultaneously when the relative movement between said parts of the detecting means is such that the detecting means renders at least one of said devices operative at a time when a device which remains operative after the detecting means has ceased to be effective thereon is still operative.

33 In an apparatus which includes means for reducing the retarding effect of the braking means of railway equipment or the like under control of relative movement of at least two wheels on such equipment decelerated by such braking means, detecting means including at least two parts respectively movable at speeds proportionate to the speeds of the respective wheels, at least two electrically-operated devices for rendering the reducing means operative when the devices are operative simultaneously, spaced contact means on one of said parts, second contact means on another of said parts, circuit means interconnecting said electrically-operated devices and contact means and through which at least one of said devices is energized to be rendered operative when the second contact means engages one of the spaced contact means and through which at least one other of the devices is energized to be rendered operative when the second contact means engages another of the spaced contact means, at least one of said devices remaining operative for a predetermined period of time after the second contact means has disengaged the spaced contact means engaged thereby to effect energization of said device whereby the devices are operative simultaneously to effect operation of the reducing means when the relative movement between said parts of the detecting means is such that the spaced contact means moves from engagement with the spaced contact means, that is engaged thereby to render operative a device which remains operative for a predetermined period of time as aforesaid, and moves into engagement with another spaced contact means to render another of said devices operative in a period of time less than said predetermined period of time.

34. In an apparatus which includes means for reducing the retarding effect of the braking means of railway equipment or the like under control of relative movement of at least two wheels on such equipment decelerated by such braking means, electrical means for operating the reducing means, detecting means including at least two parts respectively movable at speeds proportionate to the speeds of the respective wheels, at least two relays for effecting current flow to said electrical means when the relays are operative simultaneously, spaced contact means on one of said parts, second contact means on another of said parts, circuit means interconnecting said relays and said contact means and through which at least one of said relays is energized to be rendered operative when the second contact means engages one of the spaced contact means and through which at least one other of the relays is energized to be rendered operative when the second contact means engages another of the spaced contact means, at least one of said relays being a slow-to-release relay whereby the relays are operative simultaneously to effect operation of the reducing means when the relative movement between said parts of the detecting means is such that the second contact means moves from engagement with the spaced contact means that is engaged thereby to render a slow-to-release relay operative and moves into engagement with another of the spaced contact means to render another of said relays operative in a period of time less than the release time of the previously energized slow-to-release relay.

35. In an apparatus which includes electrically-operated means for reducing the retarding effect of the braking means of railway equipment or the like under control of relative movement of at least two wheels on such equipment decelerated by such braking means, a first relay for closing circuit, when operative, to the reducing means, a second relay for closing circuit, when operative, to the first relay, a slow-to-release relay for closing, when operative, circuit to the second relay and a stick circuit for the first relay, a slow-to-energize relay for opening, when operative, the stick circuit for the first relay, means for alternately closing circuit to the second relay and the slow-to-release and slow-to-energize relays, and means responsive to relative rotation between the aforesaid wheels for alternately closing circuit to the second relay and the slow-to-release and slow-to-energize relays, circuit to the first relay being closed to render it operative to thereby render the reducing means operative whenever circuit to the second relay is closed at a time the slow-to-release relay is operative, said first relay remaining operative until circuit to the second relay is opened or said slow-to-energize relay is rendered operative.

36. In an apparatus which comprises a plurality of mechanisms each embodying a means for reducing the retarding effect of the braking means of railway equipment or the like under control of relative movement of at least two wheels on such equipment decelerated by such braking means, detecting means including at least two parts respectively movable at speeds proportionate to the speeds of the respective wheels, at least two electrically-operated devices for rendering the reducing means operative when the devices are operative simultaneously, spaced contact means on one of said parts, second contact means on another of said parts, circuit means interconnecting said electrically-operated devices and contact means and through which at least one of said devices is energized to be rendered operative when the second contact means engages one of the spaced contact means and through which at least one other of the devices is energized to be rendered operative when the second contact means engages another of the spaced contact means, at least one of said devices remaining operative for a predetermined period of time after the second contact means has disengaged the spaced contact means thereby to effect energization of said device whereby the devices are operative simultaneously to effect operation of the reducing means when the relative movement between said parts of the detecting means is such that the spaced contact means moves from engagement with the spaced contact means that is engaged thereby to render operative a device which remains operative for a predetermined period of time as aforesaid and moves into engagement with another spaced contact means to render another of said devices operative in a period of time less than said predetermined period of time; and circuit means having the cooperating contact means on the aforesaid parts in each of said mechanisms connected in parallel therein, a source of current in said circuit means, and switch means in said circuit means operable to open circuit from said source to all of said cooperating contact means whereby all of said mechanisms may be simultaneously rendered inoperative upon operation of said switch means and thereby enable the braking means associated with the reducing means in the various mechanisms to be operated independently of said reducing means.

37. In an apparatus for rendering a sanding means or the like operative under control of wheels or the like on railway equipment between which a speed relation is desired, the combination of a plurality of independently operable devices operative to render effective the sanding means or the like, and means operable with the wheels or the like and operative to render the independent devices operative successively and also operative to cause at least two of said independent devices to be operative simultaneously when there is more than a predetermined deviation frim the speed relation desired between the wheels or the like, the means so rendered operative being constituted and arranged to render the sanding means or the like operative.

38. In an apparatus for rendering a sanding means or the like operative under control of wheels or the like on railway equipment between which a speed relation is desired, the combination of a plurality of electrically operated devices operable to render effective a sanding means or the like, and switch means operable with the wheels or the like and operative to successively control circuit to said electrically operated devices to thereby render said devices operative successively and also operative to cause at least two of said independent devices to be operative simultaneously when there is more than a predetermined deviation from the speed relation desired between the wheels or the like, the means so rendered operative being constituted and arranged to render the sanding means or the like operative.

39. In an apparatus for rendering a sanding means or the like operative under control of wheels or the like on railway equipment between which a speed relation is desired, the combination of a plurality of electrically operated devices operable to render effective a sanding means or the like, and switch means operable with the wheels or the like and operative to successively control circuit to said electrically operated devices to thereby render said devices operative successively at least one of said electrically operated devices being constituted and arranged to remain operative after the switch means has ceased to control circuit thereto whereby when there is more than a predetermined deviation from the speed relation desired such device will still be operative when the switch means is effective to control circuit to another of the devices so that at least two of such devices are operative simultaneously, the means so rendered operative being constituted and arranged to render the sanding means or the like operative.

40. In an apparatus for rendering a sanding means or the like operative under control of wheels or the like on railway equipment between which a speed relation is desired, the combination of a plurality of relays including contacts operative to render the sanding means or the like operative, and switch means operable with the wheels or the like and operative to control circuit to said relays to thereby so operate said relays that the contacts thereof are rendered operative successively, said switch means also being operable when there is more than a predetermined deviation from the speed relation desired between the wheels or the like to so control circuit to the relays that the contacts of at least two of said relays are rendered effective simultaneously to thereby render effective the sanding means or the like.

41. In an apparatus for rendering a sanding means or the like operative under control of wheels or the like on railway equipment between which a speed relation is desired, the combination of a plurality of relays each including contacts closable upon energization of the relay, and switch means operable with the wheels or the like and operative to close circuit to the relays successively to thereby effect energization of the relays successively, said switch means also being operative where there is more than a predetermined deviation from the speed relation desired between the wheels or the like to so close circuit to the relays that the contacts of at least two relays are closed simultaneously, the contacts so closed simultaneously being operative to control an electrical circuit and thereby render effective the sanding means or the like.

42. In an apparatus for rendering a sanding means or the like operative under control of wheels or the like on railway equipment between which a speed relation is desired, the combination of a pair of relays including contacts operable when the relays are operative simultaneously to control an electrical circuit and thereby render effective the sanding means or the like when the contacts operate to effect control of said electrical circuit, and switch means operable with the wheels or the like to alternately render said relays operative and also operative when there is more than a predetermined deviation from the speed relation desired between said wheels or the like to render said relays operative simultaneously.

43. In an apparatus for rendering a sanding means or the like operative under control of wheels or the like on railway equipment between which a speed relation is desired, the combination of a pair of relays including contacts engageable to close an electrical circuit and thereby render effective the sanding means or the like when the relays are operative simultaneously, at least one relay of such pair being a slow-to-release relay whereby the contacts thereof remain closed after the energizing circuit to such relay is broken, and switch means operable with the wheels or the like and operative to close and open the energizing circuits to said relays alternately, said switch means also being operative when there is more than a predetermined deviation from the speed relation desired between the wheels or the like to close the energizing circuit to the other relay of the pair when a slow-to-release relay of the pair is still operative to thereby render the relays operative simultaneously.

44. In an apparatus for supplying sand or the like to a rail in advance of the path of travel of at least one wheel on railway equipment or the like, means including parts disposed on each side of the point of contact of such wheel with the rail and through which sand or the like may pass to be discharged onto the rail, an electrically-operated means associated with each of said parts for controlling the flow of sand therethrough, means for conditioning one or the other of said electrically-operated means for operation, and means for automatically rendering the means conditioned for operation operative when the need for sand or the like to be discharged onto the rail arises in the course of operation of the equipment or the like.

45. In an apparatus for supplying sand or the like to a rail in advance of the path of travel of at least one wheel on railway equipment or the like, means including parts disposed on each side of the point of contact of such wheel with the rail and through which sand or the like may pass to be discharged onto the rail, an electrically-operated means associated with each of said parts for controlling the flow of sand therethrough, means associated with the means regulating the direction in which the equipment is to move for conditioning one or the other of said electrically-operated means for operation so as to insure that sand or the like will be discharged through the part on the side of the point of contact of the wheel with the rail toward which the wheel is advancing, and means for automatically rendering the means conditioned for operation operative when the need for sand or the like to be discharged onto the rail arises in the course of operation of the equipment or the like.

46. In an apparatus for rendering a sanding means operative under control of at least two independent driving wheels on railway equipment that accelerate in the course of driving such equipment, the combination of, a pair of slow-to-release relays having contacts effective when one of said relays is energized while the other is in a state of energization to close a circuit for operating said sanding means, switch means including a rotatable member having two contact strips and another rotatable member having a brush disposed to make alternate wiping contact with said contact strips when said rotatable members are rotated relative to each other, means connecting one of said rotatable switch members to one of said wheels for rotation therewith, means connecting the other of said rotatable switch members to another of said wheels for rotation therewith, said rotatable members being normally driven by said wheels at substantially the same rate and in the same direction with respect to each other, and energizing circuits to said slow-to-release relays each closable upon engagement of said brush with the respective one of said contact strips to energize its corresponding relay whereby said relays are alternately energized within the release times of each to thereby operate said sanding means when a predetermined variation in rotative speeds of the driving wheels tending toward a wheel sliding condition arises in the course of driving the railway equipment.

47. In an apparatus for rendering a sanding means on railway equipment operative under control of two independent wheels thereof at least one of which is braked in the course of decelerating such equipment, the combination of, a pair of slow-to-release relays having contacts effective when one of said relays is energized while the other is in a state of energization to close a circuit for operating said sanding means, switch means including a rotatable member having two contact strips and another rotatable member having a brush disposed to make alternate wiping contact with said contact strips when said rotatable members are rotated relative to each other, means connecting one of said rotatable switch members to one of said wheels for rotation therewith, means connecting the other of said rotatable switch members to another of said wheels for rotation therewith, said rotatable members being normally driven by said wheels at substantially the same rate and in the same direction with respect to each other, energizing circuits to said slow-to-release relays each closable upon engagement of said brush with the respective one of said contact strips to energize its corresponding relay whereby said relays are alternately energized within the release times of each to thereby operate said sanding means when a predetermined variation in rotative speeds of the driving wheels tending toward a wheel sliding condition arises in the course of braking the railway equipment, and means responsive to the direction of travel of the railway equipment to condition said sanding means for discharging sand when operated by said relays only on the side of at least said one wheel in the direction of travel thereof.

48. In an apparatus for supplying sand or the like to a rail in advance of the path of travel of at least one wheel on railway equipment or the like, means including parts disposed on each side of the point of contact of such wheel with the rail and through which sand or the like may pass to be discharged onto the rail, an electrically-operated means associated with each of said parts for controlling the flow of sand therethrough, means rotatable in opposite directions and operative by such rotation to indicate the direction in which the equipment is moving and having means associated therewith for conditioning one or the other of said electrically-operated means for operation so as to insure that sand or the like will be discharged through the part on the side of the point of contact of the wheel with the rail toward which the wheel is advancing, and means for automatically rendering the means conditioned for operation operative when the need for sand or the like to be discharged onto the rail arises in the course of a braking operation on the equipment or the like.

ROSSER L. WILSON.